(12) United States Patent
Fang et al.

(10) Patent No.: US 11,004,163 B2
(45) Date of Patent: May 11, 2021

(54) TERMINAL-IMPLEMENTED METHOD, SERVER-IMPLEMENTED METHOD AND TERMINAL FOR ACQUIRING CERTIFICATION DOCUMENT

(71) Applicant: Xiaomi Inc., Beijing (CN)

(72) Inventors: Liu Fang, Beijing (CN); Meng Xu, Beijing (CN); Jianhe Jiang, Beijing (CN); Zhenyu Wu, Beijing (CN); Xianpeng Wang, Beijing (CN); Xin Zhang, Beijing (CN)

(73) Assignee: XIAOMI INC., Beijing (CN)

( * ) Notice: Subject to any disclaimer, the term of this patent is extended or adjusted under 35 U.S.C. 154(b) by 675 days.

(21) Appl. No.: 15/367,189

(22) Filed: Dec. 2, 2016

(65) Prior Publication Data

US 2017/0161856 A1 Jun. 8, 2017

(30) Foreign Application Priority Data

Dec. 3, 2015 (CN) .......................... 201510876207.X

(51) Int. Cl.
*G06Q 50/18* (2012.01)
*G06Q 10/10* (2012.01)
(Continued)

(52) U.S. Cl.
CPC .......... *G06Q 50/18* (2013.01); *G06F 21/305* (2013.01); *G06F 21/36* (2013.01); *G06F 21/52* (2013.01);
(Continued)

(58) Field of Classification Search
CPC combination set(s) only.
See application file for complete search history.

(56) References Cited

U.S. PATENT DOCUMENTS 7,987,123 B1 7/2011 Gaffney et al.
10,146,795 B2 * 12/2018 Macciola .............. G06F 16/583
(Continued)

FOREIGN PATENT DOCUMENTS

CN 1748203 A 3/2006
CN 101410847 A 4/2009
(Continued)

OTHER PUBLICATIONS

Extended European Search Report of EP Application No. 16201885.7 dated Apr. 18, 2017.
(Continued)

*Primary Examiner* — Chrystina E Zelaskiewicz
(74) *Attorney, Agent, or Firm* — Jun He Law Offices P.C.; James J. Zhu

(57) ABSTRACT

A terminal-implemented method, a server-implemented method and a terminal for acquiring a certification document are provided. The terminal-implemented method includes: determining a target application for providing the certification document according to a user-input identification of a legal source of the certification document; acquiring page contents of the target application, the page contents containing the certification document; and sending document contents including the page contents or the certification document to a certification-document extracting server to enable certification-document extracting server to extract the certification document from the document contents.

5 Claims, 20 Drawing Sheets

(51) Int. Cl.
    *G06F 21/30*     (2013.01)
    *G06F 21/57*     (2013.01)
    *G06F 21/36*     (2013.01)
    *G06F 21/52*     (2013.01)

(52) U.S. Cl.
    CPC ............ *G06F 21/57* (2013.01); *G06Q 10/10* (2013.01); *G06F 2221/033* (2013.01); *G06F 2221/2101* (2013.01); *G06F 2221/2115* (2013.01)

(56) References Cited

U.S. PATENT DOCUMENTS

| | | | |
|---|---|---|---|
| 2009/0164522 A1 | 6/2009 | Fahey | |
| 2009/0185241 A1* | 7/2009 | Nepomniachtchi | G06Q 20/042 358/474 |
| 2012/0324236 A1 | 12/2012 | Srivastava et al. | |
| 2014/0270401 A1 | 9/2014 | Irwin et al. | |
| 2014/0298449 A1* | 10/2014 | Low | G06F 11/00 726/19 |
| 2015/0269433 A1 | 9/2015 | Amtrup et al. | |
| 2015/0324390 A1 | 11/2015 | Macciola et al. | |
| 2015/0341370 A1 | 11/2015 | Khan | |
| 2016/0171603 A1* | 6/2016 | Amtrup | G06K 9/00469 705/38 |

FOREIGN PATENT DOCUMENTS

| | | |
|---|---|---|
| CN | 102761529 A | 10/2012 |
| CN | 102801528 A | 11/2012 |
| CN | 103136660 A | 6/2013 |
| CN | 104144197 A | 11/2014 |
| CN | 104796400 A | 7/2015 |
| CN | 105471877 A | 4/2016 |
| JP | 2005014686 A | 1/2005 |
| JP | 2008176707 A | 7/2008 |
| JP | 2012073932 A | 4/2012 |
| WO | 2004055634 A2 | 7/2004 |
| WO | 2008001322 A2 | 1/2008 |

OTHER PUBLICATIONS

International Search Report of PCT Application No. PCT/CN2016/087563 dated Oct. 8, 2016.
Zaiquan Wang, "Internet Finance and SME Financing", published on Jan. 31, 2015, full text, published by China Economic Publishing House, China.
International Search Report of PCT/CN2016/087563.
The Office Action in Indian Patent Application No. 201637036915, dated Jan. 27, 2020.

* cited by examiner

TERMINAL-IMPLEMENTED METHOD, SERVER-IMPLEMENTED METHOD AND TERMINAL FOR ACQUIRING CERTIFICATION DOCUMENT

CROSS-REFERENCE TO RELATED APPLICATIONS

The present application is based upon and claims priority to Chinese Patent Application No. CN201510876207.X filed Dec. 3, 2015, the entire contents of which are incorporated herein by reference.

TECHNICAL FIELD

The present disclosure generally relates to the field of application of electronic technology, and more particularly, to a terminal-implemented method, a server-implemented method, and a terminal for acquiring a certification document.

BACKGROUND

A certification document is a document for certifying a particular attribute of a citizen, which is frequently required in many fields, in particular for financial credit. Generally, a certification document may refer to a citizen identity certification, an income certification document, a bank operation flow certification, a profession certification, and the like.

Typically, users are generally required to provide a paper certification document with an official seal to an authorized person to verify the authenticity of the certification document. Alternatively, a particular organization may acquire corresponding certification document from its network system. For example, a bank can acquire a bank operation flow certification of a user in the bank network system.

SUMMARY

According to a first aspect of embodiments of the present disclosure, there is provided a terminal-implemented method for acquiring a certification document. The method includes the following steps: determining a target application for providing the certification document according to a user-input identification of a legal source of the certification document; acquiring page contents of the target application, the page contents containing the certification document; and sending document contents including the page contents or the certification document to a certification-document extracting server to enable certification-document extracting server to extract the certification document from the document contents.

According to a second aspect of embodiments of the present disclosure, there is provided a server-implemented method for acquiring a certification document. The method includes the following steps: receiving document contents from a terminal, the document contents including page contents or the certification document, the page contents being acquired from a target application determined according to a user-input identification of a legal source of the certification document, and the page contents containing the certification document; and extracting the certification document from the document contents.

According to a third aspect of embodiments of the present disclosure, there is provided a terminal for acquiring a certification document. The terminal includes: a processor; and a memory for storing instructions executable by the processor; wherein the processor is configured to perform: determining a target application for providing the certification document according to a user-input identification of a legal source of the certification document; acquiring page contents of the target application, the page contents containing the certification document; and sending document contents including the page contents or the certification document to a certification-document extracting server to enable certification-document extracting server to extract the certification document from the document contents.

It is to be understood that both the foregoing general description and the following detailed description are exemplary only and are not restrictive of the present disclosure, as claimed.

BRIEF DESCRIPTION OF THE DRAWINGS

In order to illustrate the embodiments of the present disclosure, a brief introduction may be given hereinafter to the accompanying drawings that may be used in the description of the embodiments. Apparently, the drawings in the description below are merely for illustrating some embodiments of the present disclosure, and other drawings may be obtained by those skilled in the art according to these drawings without paying any creative labor.

FIG. 4-1 is a flow chart illustrating a method for acquiring a certification document according to another exemplary embodiment.

FIG. 4-2 is a schematic diagram of an input interface according to another exemplary embodiment.

FIG. 4-3 is a schematic diagram of an input interface according to another exemplary embodiment.

FIG. 4-4 is a flow chart illustrating a method for a terminal to determine a target application according to a user-input identification of a legal source of the certification document, according to another exemplary embodiment.

FIG. 4-5 is a flow chart illustrating a method for acquiring page contents of the target application according to another exemplary embodiment.

FIG. 4-6 is a flow chart illustrating a method for logging in the target application by accessing the webpage provided by the target application according to another exemplary embodiment.

FIG. 4-7 is a flow chart illustrating a method for performing a screen capturing operation on at least one page displayed by the target application to obtain the page contents, according to another exemplary embodiment.

FIG. 4-8 is a flow chart illustrating another method for performing a screen capturing operation on at least one page displayed by the target application to obtain the page contents, according to another exemplary embodiment.

FIG. 4-9 is a flow chart illustrating yet another method for performing a screen capturing operation on at least one page displayed by the target application to obtain the page contents, according to another exemplary embodiment.

FIG. 4-10 is a flow chart illustrating a method for a terminal to acquire page contents of a target application according to another exemplary embodiment.

FIG. 4-11 is a flow chart illustrating another method for acquiring a certification document according to another exemplary embodiment.

FIG. 4-12 is a flow chart illustrating a method for a terminal to acquire a certification document according to another exemplary embodiment.

FIG. 4-13 is a schematic diagram of a certification document according to another exemplary embodiment.

FIG. 4-14 is a schematic diagram of another certification document according to another exemplary embodiment.

FIG. 4-15 is a flow chart illustrating a method for a certification-document extracting server to verify reliability of a certification document according to another exemplary embodiment.

FIG. 5-1 is a block diagram illustrating a device for acquiring a certification document according to an exemplary embodiment.

FIG. 5-2 is a block diagram illustrating a content-acquiring module according to an exemplary embodiment.

FIG. 5-3 is a block diagram illustrating another device for acquiring a certification document according to an exemplary embodiment.

FIG. 5-4 is a block diagram illustrating yet another device for acquiring a certification document according to an exemplary embodiment.

FIG. 5-5 is a block diagram illustrating still another device for acquiring a certification document according to an exemplary embodiment.

FIG. 5-6 is a block diagram illustrating a device for acquiring a certification document according to another exemplary embodiment.

FIG. 5-7 is a block diagram illustrating another device for acquiring a certification document according to another exemplary embodiment.

FIG. 5-8 is a block diagram illustrating yet another device for acquiring a certification document according to another exemplary embodiment.

FIG. 5-9 is a block diagram illustrating still another device for acquiring a certification document according to another exemplary embodiment.

FIG. 6-1 is a block diagram illustrating a device for acquiring a certification document according to yet another exemplary embodiment.

FIG. 6-2 is a block diagram illustrating an extracting module according to yet another exemplary embodiment.

FIG. 6-3 is a block diagram illustrating another device for acquiring a certification document according to yet another exemplary embodiment.

FIG. 6-4 is a block diagram illustrating yet another device for acquiring a certification document according to yet another exemplary embodiment.

FIG. 7 is a block diagram illustrating still another device for acquiring a certification document according to yet another exemplary embodiment.

FIG. 8 is a block diagram illustrating still a device for acquiring a certification document according to still another exemplary embodiment.

The accompanying drawings herein which are incorporated into and constitute a part of the description, illustrate the embodiments according to the present disclosure, and serve as explaining the principles of the present disclosure together with the description.

DETAILED DESCRIPTION

The present disclosure will be further described in detail with reference to the drawings. Obviously, the illustrated embodiments are not all of the embodiments of the present disclosure, but only a part of them. According to the embodiments of the present disclosure, all of the other embodiments obtained by those skilled in the art without consuming any creative work fall within the protection scope of the present disclosure.

Figure 1:
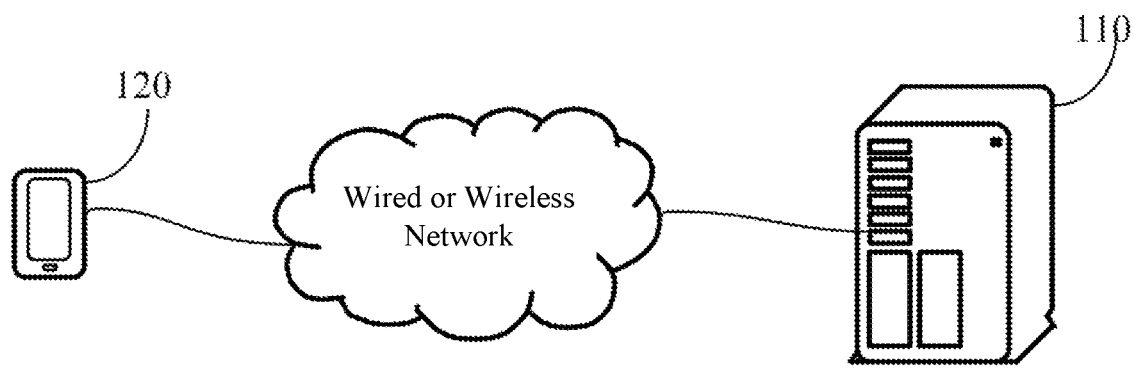
FIG. 1 is a schematic diagram illustrating an implementing environment involving methods for acquiring a certification document provided by some of the embodiments of the present disclosure, according to an exemplary embodiment.

Referring to FIG. 1, which is a schematic diagram illustrating an implementing environment involving methods for acquiring a certification document provided by some of the embodiments of the present disclosure. The implementing environment may include a certification-document extracting server 110 and at least one terminal 120. The terminal 120 can be installed with a certification extracting client.

The certification-document extracting server 110 can be a server, or a sever cluster consisting of several servers, or a cloud computing service center. The terminal 120 may be a smart phone, a computer, a multimedia player, an e-reader, a wearable device and the like.

The certification-document extracting server 110 and the terminal 120 can be connected through a wired or wireless network.

Figure 2:
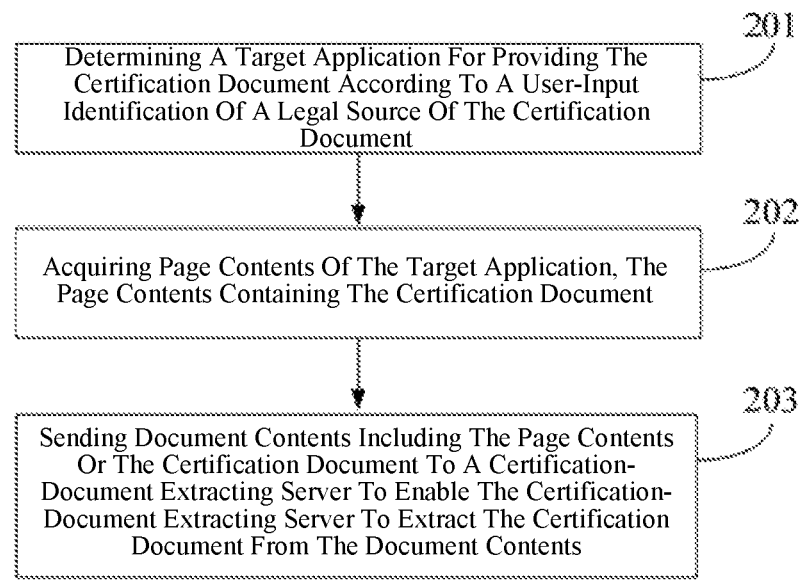
FIG. 2 is a flow chart illustrating a method for acquiring a certification document according to an exemplary embodiment.

FIG. 2 is a flow chart illustrating a method for acquiring a certification document according to an exemplary embodiment, which can be applied in the terminal 120 as shown in FIG. 1. The method includes the following steps.

At step 201, a target application (app) for providing the certification document is determined according to a user-input identification of a legal source of the certification document.

At step 202, page contents of the target application are acquired, and the page contents contain the certification document.

At step 203, document contents including the page contents or the certification document are sent to a certification-document extracting server to enable the certification-document extracting server to extract the certification document from the document contents.

Accordingly, the terminal can determine the target application according to a user-input identification of a legal source of the certification document, acquire page contents of the target application, and send to the certification-document extracting server document contents which include the page contents or the certification document. Thereby, the user does not need to submit a paper certification document, and the particular organization does not need to acquire the certification document from its network system. Therefore, the complexity of acquiring a certification document can be effectively reduced, and the efficiency of acquiring the certification document can be improved.

Figure 3:
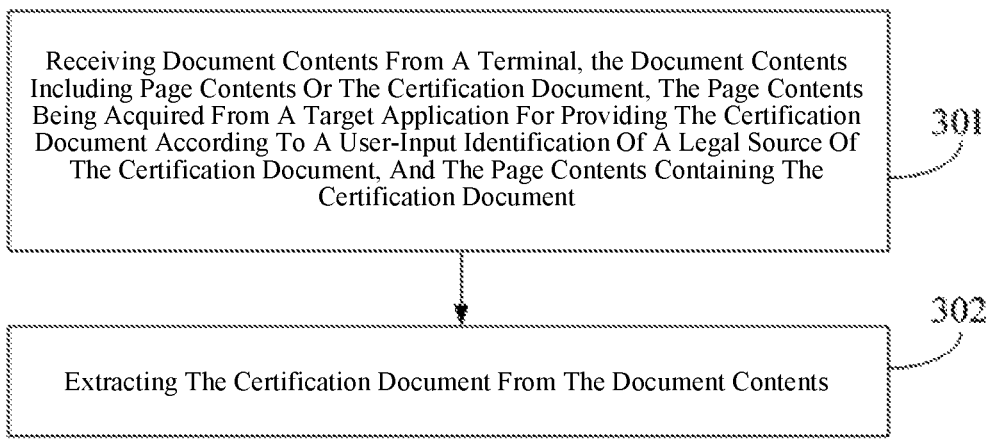
FIG. 3 is a flow chart illustrating another method for acquiring a certification document according to an exemplary embodiment.

FIG. 3 is a flow chart illustrating another method for acquiring a certification document according to an exemplary embodiment, which can be applied in the certification-document extracting server 110 as shown in FIG. 1. The method includes the following steps.

At step 301, document contents including page contents or the certification document are received from a terminal, and the page contents is acquired from a target application determined according to a user-input identification of a legal source of the certification document, and the page contents containing the certification document.

At step 302, the certification document is extracted from the document contents.

Accordingly, the certification-document extracting server can directly receive the document contents sent from the terminal, and extract the certification document from the document contents. Thereby, the user does not need to submit a paper certification document, and the particular organization does not need to acquire the certification document from its network system. Therefore, the complexity of acquiring a certification document can be effectively reduced, and the efficiency of acquiring the certification document can be improved.

Figures 1, 4:
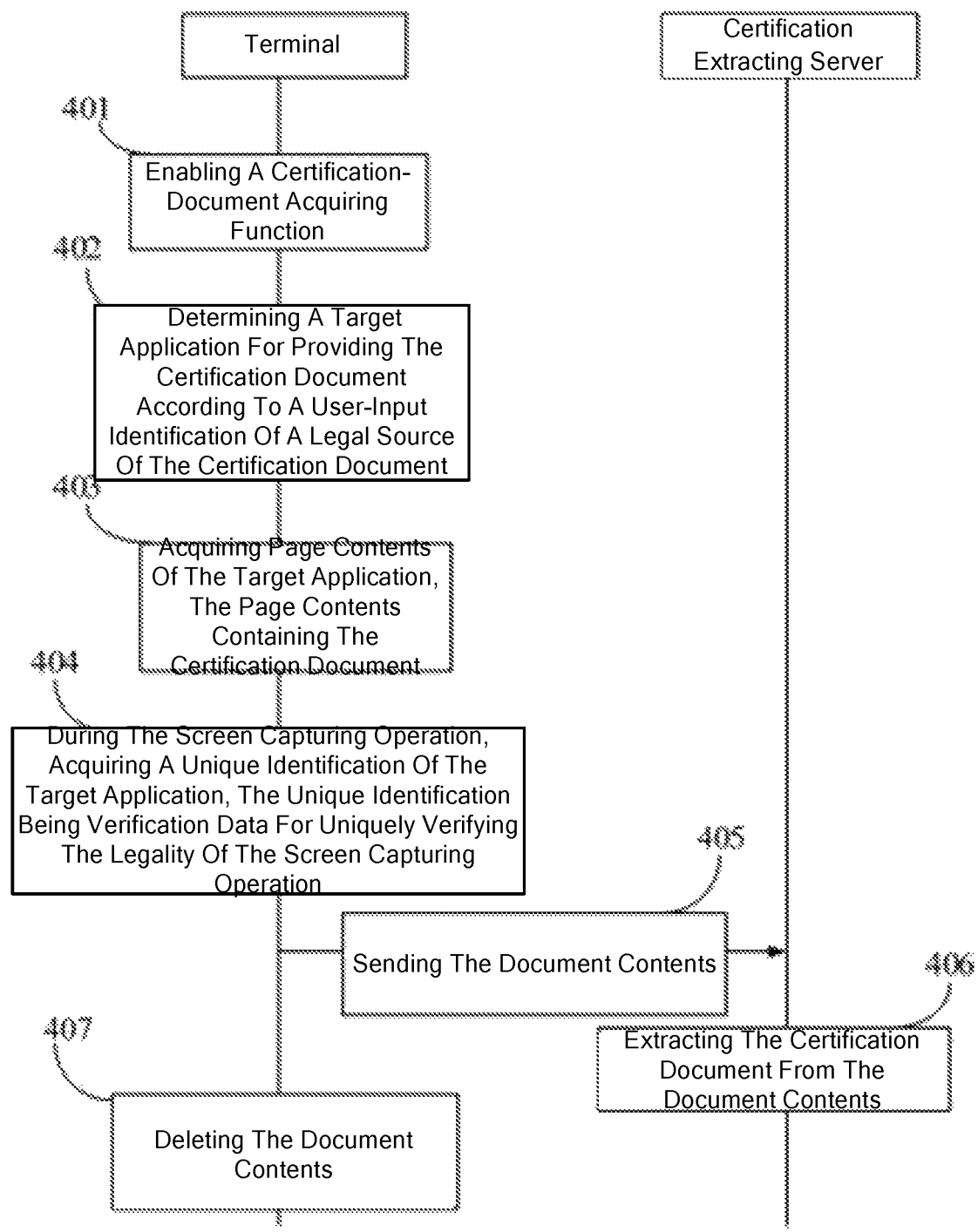
Figures 2, 4:
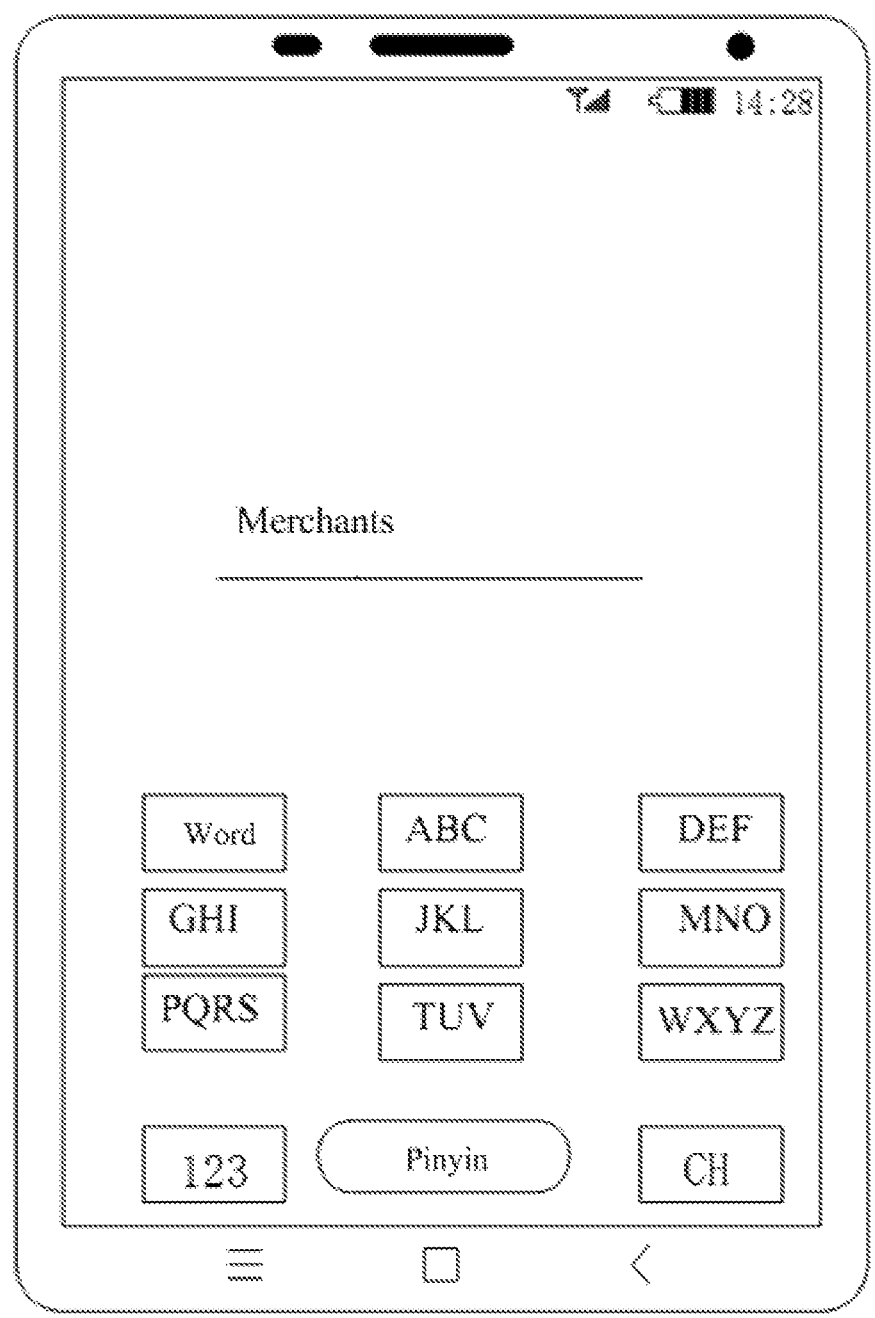
Figures 3, 4:
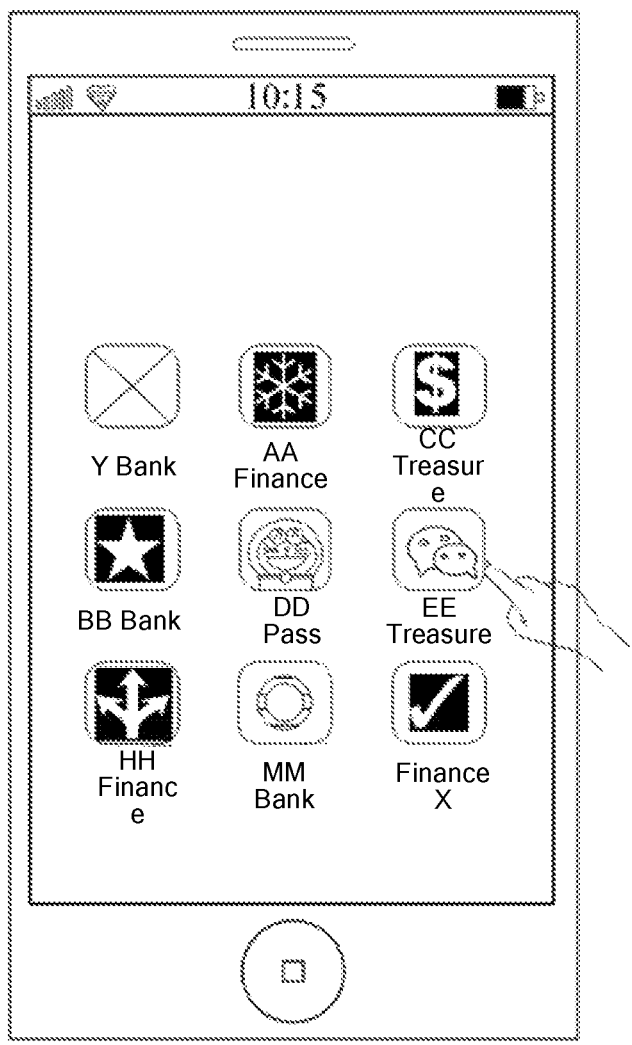
Figure 4:
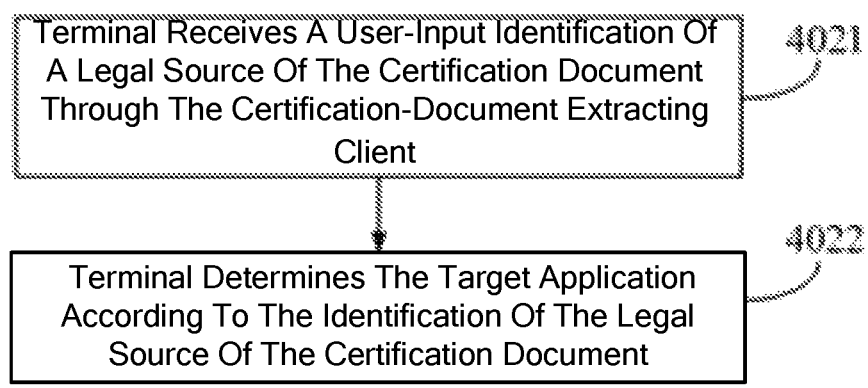

FIG. 4-1 is a flow chart illustrating a method for acquiring a certification document according to another exemplary embodiment, which can be applied in an implementing environment as shown in FIG. 1. The method includes the following steps.

At step 401, the terminal enables a certification-document acquiring function.

A certification document is a document for certifying that a citizen has some particular attribute. There are various scenarios where a certification document is required, such as applying for bank loans, applying for professional titles, and so on. The certification-document acquiring function of the terminal can be enabled in such scenario where a certification document is required.

In some embodiments, during normal operation of the terminal, the user can trigger the certification-document acquiring function to be enabled through a preset hovering button, a Home button or a preset hardware button provided on the terminal. The terminal can enable the certification-document acquiring function upon receiving the corresponding enabling instruction.

Alternatively, the terminal can be installed with a certification-document extracting client. A displayed interface of the certification-document extracting client is provided with a certification-document acquiring button. The user can enable the certification-document acquiring function by triggering the certification-document acquiring button. The certification-document extracting client can enable the certification-document acquiring function upon receiving the enabling instruction generated by triggering the certification-document acquiring button.

It should be noted that, in the embodiment of the present disclosure, the certification-document extracting client can be a finance type client, such as a bank client, a deposit client, a paying client, and the like. In practical application, there are other types of clients, which are not limited in the embodiment of the present disclosure.

At step 402, the terminal determines a target application for providing the certification document according to a user-input identification of a legal source of the certification document.

In the embodiment of the present disclosure, the identification of the legal source of the certification document can be an identification of an official organization of the certification document. For example, if the certification document involves incomes, the identification of the legal source of the certification document can be an identification of a bank official website. Accordingly, the target application for providing the certification document can be an application of an official bank website. For example, if the certification document involves social security information, the identification of a legal source of the certification document can be an identification of an official website of a social security organization. Accordingly, the target application for providing the certification document can be an application of the social security organization. The terminal can provide an input interface to the user after the certification-document acquiring function is enabled, such that the user input the identification of the legal source of the certification document.

As an example, as shown in FIG. 4-2, which is a schematic diagram of an input interface according to another exemplary embodiment. The input interface can include an input key board, and the input key board can be an input-method key board of the system of the terminal, an input-method key board of an input method client, or an input-method key board of a certification-document extracting client installed in the terminal. This is not limited by embodiments of the present disclosure. The user inputs characters through the input key board, and the terminal can take the characters input by the user as the identification of the legal source of the certification document.

In the embodiment of the present disclosure, the identification of the legal source of the certification document can include at least one of a number, a letter, a symbol, or any combinations thereof. In the embodiment of the present disclosure, the identification of the legal source of the certification document can include at least one character, and generally include a character string.

When the input interface is as shown in FIG. 4-2, the terminal can search a corresponding relationship between preset identifications of the legal sources and applications to determine a target application corresponding to the received identification of the legal source of the certification document. For example, if the identification of the legal source of the certification document received by the terminal is "Merchants Bank," by searching the corresponding relationship between identifications of the legal sources of the certification documents of the certification documents and applications, the terminal can determine that an application corresponding to "Merchants Bank" is an application of the official website of the Merchants Bank. It should be noted that, the terminal can also determine the target application corresponding to the identification of the legal source of the certification document by other means, and the embodiment of the present disclosure only illustratively describes one example.

As another example, as shown in FIG. 4-3, which is a schematic diagram of an input interface according to another exemplary embodiment. The input interface can include a plurality of trigger buttons, and each of the trigger buttons corresponds to one application. When the user presses any of the trigger buttons, the terminal can receive a corresponding identification of a legal source of the certification document, and can determine a target application according to the identification of the legal source of the certification document. In the embodiment of the present disclosure, the identification of the legal source of the document generally refers to a name of an application. For example, the name of the application of the official website of the Merchants Bank is "Merchants Bank." When the terminal displays the trigger buttons, the terminal can display the corresponding identification of the legal source of the certification document for each of the trigger buttons to prompt the user. In practical application, when the certification document is provided by the application to the user through the client, the appearance of the trigger button is the same as the button of the client corresponding to the application. For example, the client of the application of the official website of the Merchants Bank is the client of the Merchants Bank, and then the trigger button corresponding to the application of the official web site of the Merchants Bank appears the same as the button of the client of the Merchants Bank.

In the embodiment of the present disclosure, the input interface in FIG. 4-2 or FIG. 4-3 can be provided by the system of the terminal, or by the certification-document extracting client installed in the terminal. Now turning to FIG. 4-4, which is a flow chart illustrating a method for a terminal to determine a target application according to a user-input identification of a legal source of the certification document, according to another exemplary embodiment. The method includes the following steps.

At step 4021, the terminal receives a user-input identification of a legal source of the certification document through the certification-document extracting client.

In practical application, when the target application has no corresponding client, the identification of the legal source of the certification document can include the identification of the official website of the certification document. When the target application has a corresponding client, the identification of the legal source of the certification document can include the identification of the client of the target application or the identification of the server of the target application. Generally, the identification of the client of the target application is the same as the identification of the server of the target application. For example, the identification of the application server of the official website of the Merchants Bank and the identification of the client of the Merchants Bank are the same "Merchants Bank." The target application can be a finance type application, such as a bank application, a deposit client application, a paying application, and the like. In practical application, there are other types of applications, which are not limited in the embodiment of the present disclosure.

At step 4022, the terminal determines the target application according to the identification of the legal source of the certification document.

At step 403, the terminal acquires page contents of the target application, and the page contents contain the certification document.

Figures 4, 5:
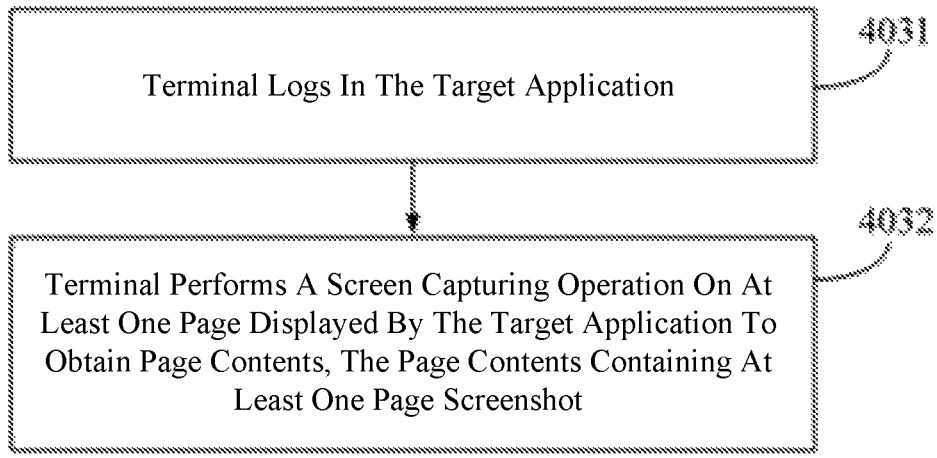

In some embodiments of the present disclosure, the page contents indicate the contents in the page provided by the target application, such as texts, pictures, and other contents. The terminal can acquire the page contents by screen capturing operation. Referring to FIG. 4-5 which is a flow chart illustrating a method for acquiring page contents of the target application according to another exemplary embodiment, the method includes the following steps.

At step 4031, the terminal logs in the target application.

In the embodiment of the present disclosure, since the target application can have a corresponding client, or can only correspond to the official website, the approaches for logging in the target application can be various, including logging the target application through the client of the target application, or logging the target application by accessing the webpage provided by the target application.

Figures 4, 5, 6:
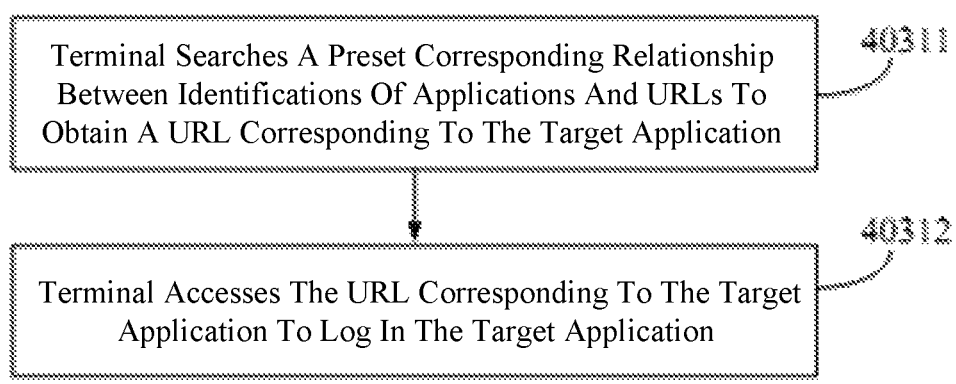

Referring to FIG. 4-6 which is a flow chart illustrating a method for logging the target application by accessing the webpage provided by the target application according to another exemplary embodiment.

At step 40311, the terminal searches a preset corresponding relationship between identifications of applications and Uniform Resource Locators (URLs) to obtain a URL corresponding to the target application.

The preset corresponding relationship between the identifications of applications and URLs can be stored in the terminal. The corresponding relationship can be in a form of a table. In practical application, the corresponding relationship can be updated periodically, and all the recorded URLs are reliable and of official certification websites to ensure the reliability of the webpage provided. As shown in Table 1, for example, the identification of the application "Y bank" corresponds to a URL "www.1234*.com," the identification of the application "DD pass" corresponds to a URL "www.4567*.com," the identification of the application "BB bank" corresponds to a URL "www.8910*.com." As an example, it is assumed that the identification of the target application is "DD pass," then by searching the corresponding relationship between the identifications of applications and URLs, as recorded in Table 1, a URL "www.4567*.com" can be obtained.

TABLE 1

| Identifications of Applications | URLs |
| --- | --- |
| Y bank | www.1234***.com |
| DD pass | www.4567***.com |
| BB bank | www.8910***.com |

At step 40312, the terminal accesses the URL corresponding to the target application to log in the target application.

The terminal accesses the resources indicated by the URL to obtain a corresponding logging page. As an example, it is assumed that the identification of the target application is BB bank, and the corresponding URL is www.8910*.com, then the terminal accesses the official website with the URL www.8910*.com to obtain a logging page provided by the application of the official website of the BB bank.

At step 4032, the terminal performs a screen capturing operation on at least one page displayed by the target application to obtain page contents, and the page contents contain at least one page screenshot.

As one approach shown in FIG. 4-7, which is a flow chart illustrating a method for performing a screen capturing operation on at least one page displayed by the target application to obtain the page contents, according to another exemplary embodiment, the method includes the following steps.

At step 40321, the terminal starts with a screen capturing operation on the logging page displayed by the target application.

At step 40322, when a page displayed by the target application does not change during a preset time period, or the target application displays the logging page again, the terminal stops the screen capturing operation.

In the embodiment of the present disclosure, in one example, when it is detected that the page displayed by the target application does not change during a preset time period, it can be considered that the user has stopped browsing the page of the target application, and then the screen capturing operation can be stopped. As another example, when the target application displays the logging page again, it can be considered that the user wants to change a user account, and then the screen capturing operation is stopped to ensure that the current screen capturing operation is performed for the same user account.

It should be noted that, when the page of the target application is displayed through the client of the target application, in the same client, each page is provided with a corresponding page name. In this case, the terminal can record the page name of the logging page, and when the name of the logging page appears again, the screen capturing operation is stopped. It should be noted that the page name can be a textual name such as "logging page," or can be a character string such as "001."

At step 40323, the terminal takes the at least one page screenshot acquired from the start of the screen capturing operation to the end of the screen capturing operation as the page contents.

The above steps 40321 to 40323 can be performed by the system of the terminal, or by the certification-document extracting client installed in the terminal. It should be noted that, the screen capturing operation in the above steps 40321 to 40323 can be triggered by various conditions. For example, the terminal can perform a screen capturing operation each time when the target application displays a page. For example, the terminal can perform a screen capturing operation on all pages displayed during a time period from logging on the user account to logging out the user account. The terminal can also perform one screen capturing operation at every preset time interval from the time logging in the logging page.

As a second approach shown in FIG. 4-8 which is a flow chart illustrating another method for performing a screen capturing operation on at least one page displayed by the target application to obtain the page contents, according to another exemplary embodiment, the method includes the following steps.

At step 40324, the terminal receives a screen capturing instruction generated by triggering a button for capturing a screen.

The terminal can provide a button for capturing a screen to the user. When the user triggers the button for capturing a screen, a screen capturing instruction is generated. Then the terminal can perform a screen capturing operation according to the screen capturing instruction. The button for capturing a screen can be any of a hovering button, a Home button, a preset hardware button. As the second approach of step 4032, the screen capturing operation is performed by the user triggering the button for capturing a screen, so that the privacy of the user can be protected since the user can initiatively perform the screen capturing operation and can select the necessary page he or she wants to capture, thus improving user experience.

At step 40325, the terminal performs a screen capturing operation on a current page of the target application according to the received screen capturing instruction to obtain the at least one page screenshot as the page contents.

As a third approach shown in FIG. 4-9 which is a flow chart illustrating yet another method for performing a screen capturing operation on at least one page displayed by the target application to obtain the page contents, according to another exemplary embodiment, the method includes the following steps.

At step 40326, the terminal detects the at least one page one by one to determine whether any page displayed by the target application contains a preset certification character.

As an example, detecting the at least one page one by one to determine whether any page displayed by the target application contains a preset certification character can be implemented with Optical Character Recognition (OCR) technology. In the embodiment of the present disclosure, the preset certification character can be a character indicating the particular attribute of a citizen, such as an identification of a citizen ID number, an identification of income account, an identification of a bank operation flow, and the like. For example, in such cases, the preset certification character can be "citizen ID number," "payee's account," "payment account," "salary," "company name," and so on.

At step 40327, from the at least one page, the terminal performs a screen capturing operation on a page containing a preset certification character to obtain the at least one page screenshot as the page contents.

At step 40328, from the at least one page, the terminal does not perform screen capturing operation on pages without the preset certification character.

As a third approach of step 4032, the screen capturing operation is performed depending on whether the preset certification character is detected. Thereby, it can accurately acquire the certification document.

In practical application, the above three approaches for the terminal to perform a screen capturing operation on at least one page displayed by the target application to obtain page contents at step 4032 can be combined with each other, which will not be repeated in the embodiment of the present disclosure.

In some embodiments of the present disclosure, the terminal can also acquire the page contents of the target application by other means. Referring to FIG. 4-10, which is a flow chart illustrating a method for a terminal to acquire page contents of a target application according to another exemplary embodiment, the method includes the following steps.

At step 4033, the terminal logs in the target application.

Step 4033 can refer to the above step 4031, and it will not be repeated in the embodiment of the present disclosure.

At step 4034, the terminal acquires the page contents from at least one page window of the target application by means of data, and the page contents contain contents of the at least one page window.

As an example, the terminal can acquire window contents from a display component for displaying the page window of the target application to obtain contents of at least one window as the page contents. Since the display component of the terminal is configured to display texts and images, the display component can include a display screen, a processor, etc., and data to be displayed is generally displayed after being processed by the display component. Thus, the display component can store window contents of the page windows of the target application. The system of the terminal can directly acquire the page contents from the window contents via an interface to the display component.

In practical application, there are other manners for the terminal to acquire the page contents from the page windows of the target application by means of data, and will not be elaborated in the embodiment of the present disclosure.

It should be noted that in practical application, the terminal is installed with a certification-document extracting client, and it will be more accurate to capture a page from a client of the target application. Therefore, before step 4031 or step 4033, the method for acquiring a certification document provided by the embodiment of the present disclosure can also include detection of the client of the target application. Referring to FIG. 4-11, which is a flow chart illustrating another method for acquiring a certification document according to another exemplary embodiment. The method can be applied in the implementing environment as shown in FIG. 1, and includes the following steps.

At step 4035, the terminal displays a starting button of the client of the target application through a certification-document extracting client.

The starting button of the client of the target application displayed by the terminal through a certification-document extracting client can be as shown in FIG. 4-3. A triggering button in the input interface can be the starting button of the client.

At step 4036, the terminal receives a starting instruction generated by the user triggering the starting button.

At step 4037, the terminal detects whether the terminal is installed with a client of the target application according to the starting instruction.

Detection is required in cases where the terminal only displays the starting button of the client of the target application, but does not actually be installed with the client of the target application.

At step 4038, when the terminal is installed with the client of the target application, the client of the target application is started.

After the terminal starts the client of the target application, the above step 4031 or 4033 may be performed.

At step 4039, when the terminal is not installed with the client of the target application, an installation prompt message for prompting the user to install the client of the target application is displayed.

When the terminal is not installed with the client of the target application, the terminal can display an installation prompt message, thus, user can decide whether to install the client of the target application. When the user decides to install the client of the target application, the terminal is installed with the client. Then the terminal starts the client and performs the process of logging in the target application through the client of the target application in step 4031 or 4033. When the user decides not to install the client of the target application, the process of logging in the target application by accessing a webpage provided by the target application in step 4031 or 4033 may be performed.

At step 404, while the terminal performs the screen capturing operation, a unique identification of the target application is acquired, and the unique identification is verification data for uniquely verifying the legality of the screen capturing operation.

For example, when the target application has no corresponding client, the unique identification can be an identification of the server of the target application; and when the target application has a corresponding target client, the unique identification can be at least one of a package name and a signature.

Here, the package name can be a unique identification of the application. That is, the package name is required to be unique, and one package represents one application. It is not allowed that two applications have the same package name. The package name is mainly for the system of the terminal to identify an application.

In order to ensure that each application developer has a legal identification and prevent the developer from reusing a package name of an installed program, the Android Package (APK for short) for each legal application is provided with a unique signature.

In the embodiment of the present disclosure, an application can be identified with a package name or a signature, or can be identified with both a package name and a signature. In practical application, it may more effectively ensure the legality of the application to identify an application with a package name and a signature to prevent illegal copy. In the embodiment of the present disclosure, the client refers to the client of the application, and each client is also uniquely identified with a package name and a signature.

At step 405, the terminal sends the document contents to the certification-document extracting server.

It should be noted that, before the terminal sends the document contents, the page contents should be stored. In order to ensure the security of the page screenshots, the page contents can be stored in isolation in a predetermined position; and/or, the page contents can be encrypted and stored.

In the embodiment of the present disclosure, the terminal can extract the certification document from the page contents and send the certification document to the certification-document extracting server. Alternatively, the terminal can send page contents which contain the certification document to the certification-document extracting server to enable certification-document extracting server to extract the certification document from the page contents.

In one approach, as can be seen from step 403, the page contents acquired by the terminal can include at least one page screenshot. Some page screenshots can include no contents about the certification document. For example, the at least one page screenshot can include a page screenshot of the logging page which generally does not include the certification document. In such case, the terminal can extract the certification document from the page contents, and delete other page screenshots which do not contain the certification document. Then, the terminal sends the extracted certification document to the certification-document extracting server. Referring FIG. 4-12, which is a flow chart illustrating a method for a terminal to acquire a certification document according to another exemplary embodiment, the method includes the following steps.

At step 4051, the terminal detects the at least one page screenshot one by one to determine whether any of the at least one page screenshot contains a preset certification character.

Detecting the at least one page screenshot one by one to determine whether any of the at least one page screenshot contains a preset certification character can be implemented with OCR technology. In the embodiment of the present disclosure, the preset certification character can be a character indicating the particular attribute of a citizen, such as an identification of a citizen ID number, an identification of income account, an identification of a bank operation flow, and the like. For example, in such cases, the preset certification character can be "citizen ID number," "payee's account," "payment account," "salary," "company name," and so on.

At step 4052, from the at least one page screenshot, the terminal determines the page screenshot which contains the preset certification character as the certification document.

For example, as shown in FIGS. 4-13 and 4-14, which are schematic diagrams of a certification document respectively according to another exemplary embodiment. Here, the page as shown in FIG. 4-13 contains a certification character "payee's account," and the page as shown in FIG. 4-14 contains a certification character "salary."

It should be noted that, since in step 403, as a third approach of step 4032, the screen capturing operation is performed depending on whether the preset certification character is detected, the steps 4051 and 4052 can be skipped, and the page screenshot contained in the page contents is taken as the certification document.

Optionally, when the terminal acquires the page contents by a method as shown in FIG. 4-10 and the page contents include at least one window content, the terminal can detect the page contents page by page to determine whether any of the window content contains the preset certification character. In the page contents, the window content which contains the preset certification character is taken as the certification document.

In another approach, the document contents can include the page contents. In such case, the terminal directly sends the document contents to the certification-document extracting server. The document contents can include the unique identification extracted at step 404.

It should be noted that, before step 405, the terminal can verify the reliability of the certification document to ensure that the certification document is valid and legal and to avoid illegal modification of the certification document. As an example, the terminal can search a preset reliable-identification table for recording unique identifications of reliable applications. When the reliable-identification table records the unique identification of the target application, the terminal performs the step 405 and sends the document contents to the certification-document extracting server. When the reliable-identification table does not record the unique identification of the target application, the terminal determines that the certification document in the document contents is illegally acquired. Then, the step 405 of sending the document contents to the certification-document extracting server will not be performed, and generally corresponding document contents are deleted.

As an example, the terminal can record the unique identifications of the reliable applications in a reliable-unique-identification table. For example, these unique identifications are unique identifications of the client of the official applications. For example, the reliable-unique-identification table records the package name and signature of Merchants Bank, and package name and signature of Mipay, and the like.

Since the target application can be a finance type application in most cases, and the number of applications of the finance type is limited, the space for recording the unique identifications is relatively small. It can effectively ensure the reliability of the target application by searching the preset reliable-unique-identification table. When the terminal searches out the unique identification of the target application in the reliable-unique-identification table, the terminal can send the document contents to the certification-document extracting server, thereby ensuring that the certification document is acquired from the official application rather than a certification document modified by the user. Thereby, the reliability of the document contents sent can be ensured. When the terminal does not search out the unique identification of the target application in the reliable-unique-identification table, the terminal can determine that the document contents are not reliable, and can delete the document contents. The terminal can display a prompt message indicating that the certification document provided by the user is not reliable, and the user is required to submit another certification document.

At step 406, the certification-document extracting server extracts the certification document from the document contents.

After the certification-document extracting server receives the document contents sent by the terminal, the certification document is extracted from the document contents.

In one embodiment, if the document contents include the page contents, and the page contents include at least one page screenshot, the certification-document extracting server can detect the at least one page screenshot one by one to determine whether any of the page screenshot contains the preset certification character. Detecting the at least one page screenshot one by one to determine whether any of the page screenshot contains the preset certification character can be implemented with OCR technology. From the at least one page screenshot, the certification-document extracting server can take a page screenshot which contains the preset certification character as the certification document. The specific process can refer to the above steps 4051 and 4052 of the process of the terminal extracting the certification document from the document contents. Optionally, the document contents can include the page contents, and the page contents can include at least one window content. In this case, the certification-document extracting server can detect the at least one window content one by one to determine whether any window content contains the preset certification character. From the page contents, the window content which contains the preset certification character can be taken as the certification document.

In another embodiment, the document contents can include the certification document, and the certification-document extracting server can directly acquire the certification document from the document contents.

It should be noted that, after the certification-document extracting server extracts the certification document, whether the certification document is reliable can be verified. As an example, the terminal can search a preset reliable-identification table which records unique identifications of reliable applications. When the reliable-identification table records the unique identification of the target application, it can be determined that the certification document in the document contents is a reliable certification document. The specific process can refer to the above described process of the terminal verifying the reliability of the certification document before step 405.

As an example, the document contents also include the unique identification of the target application for verifying whether the screen capturing operation is legal. Referring to FIG. 4-15, which is a flow chart illustrating a method for a certification-document extracting server to verify reliability of a certification document according to another exemplary embodiment. As shown in FIG. 4-15, the method includes the following steps.

At step 4061, the certification-document extracting server acquires format information of each document of the certification document.

In the embodiment of the present disclosure, the certification-document extracting server can record reliable format information corresponding to each of the unique identifications. For example, the server records reliable format information corresponding to the unique identification "Y bank" and reliable format information corresponding to the unique identification "DD pass." The format information recorded in a reliable-format table is previously defined. The format information can be format information of a client interface, or format information of a webpage. For example, when the format information is format information of a client interface, the format information can be recorded for various interface formats of the client of Merchants Bank, various interface formats of the client of Mipay, and so on. These interface formats can include parameters such as layout of page contents, colors of the page, and the like.

The certification-document extracting server searches the reliable format information corresponding to each of the unique identifications to obtain reliable format information corresponding to the unique identification of the target application.

At step 4062, the certification-document extracting server acquires a reliable-format table corresponding to the unique identification of the target application, and the reliable-format table for recording reliable format information corresponds to the unique identification of the target application.

At step 4063, the certification-document extracting server searches the reliable-format table corresponding to the unique identification of the target application.

At step 4064, when the reliable-format table records the format information of each document of the certification document, the certification-document extracting server determines that the certification document in the document contents is a reliable certification document.

When the certification-document extracting server determines that the certification document in the document contents is a reliable certification document, the certification document can be submitted to relevant organization or unit.

At step 4065, when the reliable-format table does not record the format information of each document of the certification document, the certification-document extracting server determines that the certification document in the document contents is not a reliable certification document.

When the certification-document extracting server determines that the certification document in the document contents is not reliable, the certification document can be deleted, and a prompt message can be displayed to the terminal indicating that the certification document provided by the user is not reliable and the user is required to submit another certification document.

At step 407, the terminal deletes the document contents.

In the embodiment of the present disclosure, in order to ensure the security of the certification document, the terminal can delete the certification document after the terminal submits the document contents to the certification-document extracting application. In the embodiment of the present disclosure, in order to ensure the security of the certification document, the terminal can delete the document contents after the terminal submits the document contents to the certification-document extracting server.

It should be noted that, the steps of the method for acquiring a certification document provided by the embodiment of the present disclosure can be performed in other orders. Also, some of the steps can be skipped, and other steps can be added. For example, steps 4061 to 4065 can be skipped. It would be readily obvious for those skilled in the art to anticipate a modified method within the technical scope of the present disclosure, which should be covered within the protection scope of the present disclosure and will not be elaborated herein.

Accordingly, the terminal can determine the target application according to a user-input identification of a legal source of the certification document, acquire page contents of the target application, and send to the certification-document extracting server document contents which include the page contents or the certification document. Thereby, the user does not need to submit a paper certification document, and the particular organization does not need to acquire the certification document from its network system. Therefore, the complexity of acquiring a certification document can be effectively reduced, and the efficiency of acquiring the certification document can be improved.

FIG. 5-1 is a block diagram illustrating a device for acquiring a certification document according to an exemplary embodiment, which can be applied in the terminal 120 as shown in FIG. 1. As shown in FIG. 5-1, the device includes a determining module 501, a content-acquiring module 502 and a sending module 503.

The determining module 501 is configured to determine a target application for providing the certification document according to a user-input identification of a legal source of the certification document.

The content-acquiring module 502 is configured to acquire page contents of the target application, the page contents containing the certification document.

The sending module 503 is configured to send document contents including the page contents or the certification document to a certification-document extracting server to enable certification-document extracting server to extract the certification document from the document contents.

Accordingly, the determining module can determine the target application according to a user-input identification of a legal source of the certification document, the content-acquiring module can acquire page contents of the target application, and the sending module can send to the certification-document extracting server document contents which include the page contents or the certification document. Thereby, the user does not need not to submit a paper certification document, and the particular organization does not need to acquire the certification document from its network system. Therefore, the complexity of acquiring a certification document can be effectively reduced, and the efficiency of acquiring the certification document can be improved.

FIG. 5-2 is a block diagram illustrating a content-acquiring module 502 according to an exemplary embodiment. As shown in FIG. 5-2, the content-acquiring module 502 includes: a logging sub-module 5021 configured to log in the target application; and a screen-capturing sub-module 5022 configured to perform a screen capturing operation on at least one page displayed by the target application to obtain the page contents, and the page contents contain at least one page screenshot.

Optionally, the screen-capturing sub-module 5022 is configured to: start with a screen capturing operation on the logging page displayed by the target application; when a page displayed by the target application does not change during a preset time period, or the target application displays the logging page again, stop the screen capturing operation; and take the at least one page screenshot acquired from the start of the screen capturing operation to the end of the screen capturing operation as the page contents.

Optionally, the screen-capturing sub-module 5022 is configured to: receive a screen capturing instruction generated by triggering a button for capturing a screen, and the button for capturing a screen is any of a hovering button, a Home button or a preset hardware button; and perform a screen capturing operation on a current page of the target application according to the received screen capturing instruction to obtain the at least one page screenshot as the page contents.

Optionally, the screen-capturing sub-module 5022 is configured to: detect the at least one page one by one to determine whether any page displayed by the target application contains a preset certification character; and from the at least one page, perform a screen capturing operation on a page containing a preset certification character to obtain the at least one page screenshot as the page contents.

FIG. 5-3 is a block diagram illustrating another content-acquiring module 502 according to an exemplary embodiment. As shown in FIG. 5-3, the content-acquiring module 502 includes: a logging sub-module 5023 configured to log in the target application; and an acquiring sub-module 5024 configured to acquire the page contents from at least one page window of the target application by means of data.

The logging sub-module 5021 or the logging sub-module 5023 is configured to: log in the target application through a client of the target application; or log in the target application by accessing a webpage provided by the target application.

FIG. 5-4 is a block diagram illustrating yet another device for acquiring a certification document according to an exemplary embodiment, which can be applied in the terminal 120 as shown in FIG. 1. As shown in FIG. 5-4, the device includes a determining module 501, a content-acquiring module 502, a sending module 503, a character-detecting module 504 and a deciding module 505.

The determining module 501 is configured to determine a target application for providing the certification document according to a user-input identification of a legal source of the certification document.

The content-acquiring module 502 is configured to acquire page contents of the target application, the page contents containing the certification document.

The sending module 503 is configured to send document contents including the page contents or the certification document to a certification-document extracting server to enable the certification-document extracting server to extract the certification document from the document contents.

The character-detecting module 504 is configured to detect the at least one page screenshot one by one to determine whether any of the at least one page screenshot contains a preset certification character.

Optionally, the character-detecting module 504 is configured to detect the at least one page screenshot one by one to determine whether any of the at least one page screenshot contains a preset certification character with OCR technology.

The deciding module 505 is configured to, from the at least one page screenshot, determine the page screenshot which contains the preset certification character as the certification document.

FIG. 5-5 is a block diagram illustrating still another device for acquiring a certification document according to an exemplary embodiment, which can be applied in the terminal 120 as shown in FIG. 1. As shown in FIG. 5-5, the device includes a determining module 501, a content-acquiring module 502, a sending module 503 and an identification-acquiring module 506.

The determining module 501 is configured to determine a target application for providing the certification document according to a user-input identification of a legal source of the certification document.

The content-acquiring module 502 is configured to acquire page contents of the target application, the page contents containing the certification document.

The sending module 503 is configured to send document contents including the page contents or the certification document to a certification-document extracting server to enable the certification-document extracting server to extract the certification document from the document contents.

The identification-acquiring module 506 is configured to, during the screen capturing operation, acquire a unique identification of the target application, and the unique identification is verification data for uniquely verifying the legality of the screen capturing operation.

FIG. 5-6 is a block diagram illustrating a device for acquiring a certification document according to another exemplary embodiment, which can be applied in the terminal 120 as shown in FIG. 1. As shown in FIG. 5-6, the device includes a determining module 501, a content-acquiring module 502, a sending module 503, an identification-acquiring module 506 and a searching module 507.

The determining module 501 is configured to determine a target application for providing the certification document according to a user-input identification of a legal source of the certification document.

The content-acquiring module 502 is configured to acquire page contents of the target application, and the page contents contain the certification document.

The sending module 503 is configured to send document contents including the page contents or the certification document to a certification-document extracting server to enable the certification-document extracting server to extract the certification document from the document contents.

The identification-acquiring module 506 is configured to, during the screen capturing operation, acquire a unique identification of the target application, and the unique identification is verification data for uniquely verifying the legality of the screen capturing operation.

The searching module 507 is configured to search a preset reliable-identification table for recording unique identifications of reliable applications.

The sending module 501 is configured to: when the reliable-identification table records the unique identification of the target application, send the document contents to the certification-document extracting server.

Figures 4, 5, 6, 7:
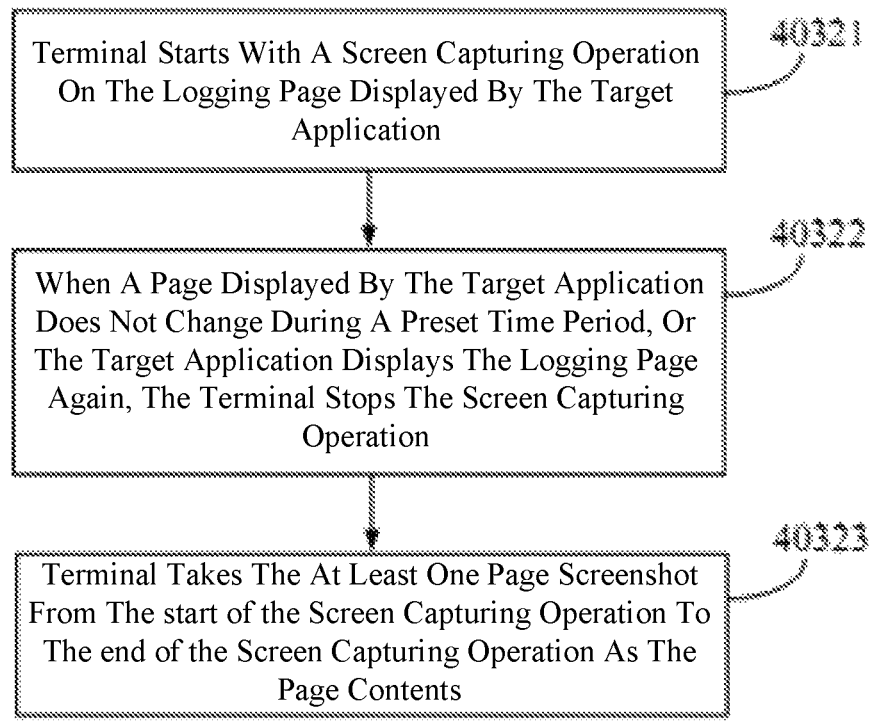

FIG. 5-7 is a block diagram illustrating another device for acquiring a certification document according to another exemplary embodiment, which can be applied in the terminal 120 as shown in FIG. 1. As shown in FIG. 5-7, the device includes a determining module 501, a content-acquiring module 502, a sending module 503 and a storing module 508.

The determining module 501 is configured to determine a target application for providing the certification document according to a user-input identification of a legal source of the certification document.

The content-acquiring module 502 is configured to acquire page contents of the target application, and the page contents contain the certification document.

The sending module 503 is configured to send document contents including the page contents or the certification document to a certification-document extracting server to enable the certification-document extracting server to extract the certification document from the document contents.

The storing module 508 is configured to store the page contents in isolation in a predetermined position; and/or encrypt and store the page contents.

FIG. 5-8 is a block diagram illustrating yet another device for acquiring a certification document according to another exemplary embodiment, which can be applied in the terminal 120 as shown in FIG. 1. As shown in FIG. 5-8, the device includes a determining module 501, a content-acquiring module 502, a sending module 503 and a deleting module 509.

The determining module 501 is configured to determine a target application for providing the certification document according to a user-input identification of a legal source of the certification document.

The content-acquiring module 502 is configured to acquire page contents of the target application, and the page contents contain the certification document.

The sending module 503 is configured to send document contents including the page contents or the certification document to a certification-document extracting server to enable the certification-document extracting server to extract the certification document from the document contents.

The deleting module 509 is configured to, after the document contents are sent to the certification-document extracting server, delete the document contents.

FIG. 5-9 is a block diagram illustrating still another device for acquiring a certification document according to another exemplary embodiment, which can be applied in the terminal 120 as shown in FIG. 1. As shown in FIG. 5-9, the device includes a determining module 501, a content-acquiring module 502, a sending module 503, a displaying module 510, a receiving module 511, a client-detecting module 512, a starting module 513 and a prompting module 514.

The determining module 501 is configured to determine a target application for providing the certification document according to a user-input identification of a legal source of the certification document.

The content-acquiring module 502 is configured to acquire page contents of the target application, the page contents containing the certification document.

The sending module 503 is configured to send document contents including the page contents or the certification document to a certification-document extracting server to enable the certification-document extracting server to extract the certification document from the document contents.

The displaying module 510 is configured to display a starting button of the client of the target application through a certification-document extracting client.

The receiving module 511 is configured to receive a starting instruction generated by a user triggering the starting button.

The client-detecting module 512 is configured to detect whether the terminal is installed with a client of the target application according to the starting instruction.

The starting module 513 is configured to, when the terminal is installed with the client of the target application, start the client of the target application.

The prompting module 514 is configured to, when the terminal is not installed with the client of the target application, display an installation prompt message for prompting the user to install the client of the target application.

Accordingly, the determining module can determine the target application according to a user-input identification of a legal source of the certification document, the content-acquiring module can acquire page contents of the target application, and the sending module can send to the certification-document extracting server document contents which include the page contents or the certification document. Thereby, the user does not need to submit a paper certification document, and the particular organization does not need to acquire the certification document from its network system. Therefore, the complexity of acquiring a certification document can be effectively reduced, and the efficiency of acquiring the certification document can be improved.

FIG. 6-1 is a block diagram illustrating a device for acquiring a certification document according to yet another exemplary embodiment, which can be applied in the certification-document extracting server 110 as shown in FIG. 1. As shown in FIG. 6-1, the device includes a receiving module 601 and an extracting module 602.

The receiving module 601 is configured to receive document contents from a terminal, the document contents includes page contents or the certification document, the page contents is acquired from a target application for providing the certification document according to a user-input identification of a legal source of the certification document, and the page contents contain the certification document.

The extracting module 602 is configured to extract the certification document from the document contents.

Accordingly, the receiving module can directly receive the document contents sent from the terminal, and the extracting module can extract the certification document from the document contents. Thereby, the user does not need to submit a paper certification document, and the particular organization does not need to acquire the certification document from its network system. Therefore, the complexity of acquiring a certification document can be effectively reduced, and the efficiency of acquiring the certification document can be improved.

Optionally, the document contents contain the page contents, and the page contents contain at least one page screenshot. FIG. 6-2 is a block diagram illustrating an extracting module 602 according to yet another exemplary embodiment. As shown in FIG. 6-2, the extracting module 602 includes: a detecting sub-module 6021 configured to detect the at least one page screenshot one by one to determine whether any of the at least one page screenshot contains a preset certification character; and a determining sub-module 6022 configured to, from the at least one page screenshot, determine the page screenshot which contains the preset certification character as the certification document.

Optionally, the detecting sub-module 6021 is configured to: detect the at least one page screenshot one by one to determine whether any of the at least one page screenshot contains a preset certification character with OCR technology.

Optionally, the document contents further contain a unique identification of the target application, and the unique identification is verification data for uniquely verifying the legality of a screen capturing operation. FIG. 6-3 is a block diagram illustrating another device for acquiring a certification document according to yet another exemplary embodiment, which can be applied in the certification-document extracting server 110 as shown in FIG. 1. As shown in FIG. 6-3, the device includes a receiving module 601, an extracting module 602, a first searching module 603 and a first determining module 604.

The receiving module 601 is configured to receive document contents from a terminal, the document contents includes page contents or the certification document, the page contents is acquired from a target application for providing the certification document according to a user-input identification of a legal source of the certification document, and the page contents contain the certification document.

The extracting module 602 is configured to extract the certification document from the document contents.

The first searching module 603 is configured to search a preset reliable-identification table for recording unique identifications of reliable applications.

The first determining module 604 is configured to, when the reliable-identification table records the unique identification of the target application, determine that the certification document in the document contents as a reliable certification document.

Optionally, the document contents further contain a unique identification of the target application, and the unique identification is verification data for uniquely verifying the legality of a screen capturing operation. FIG. 6-4 is a block diagram illustrating yet another device for acquiring a certification document according to yet another exemplary embodiment, which can be applied in the certification-document extracting server 110 as shown in FIG. 1. As shown in FIG. 6-4, the device includes a receiving module 601, an extracting module 602, an information-acquiring module 605, an information-table-acquiring module 606, a second searching module 607 and a second determining module 608.

The receiving module 601 is configured to receive document contents from a terminal, the document contents includes page contents or the certification document, the page contents is acquired from a target application for providing the certification document according to a user-input identification of a legal source of the certification document, and the page contents contain the certification document.

The extracting module 602 is configured to extract the certification document from the document contents.

The information-acquiring module 605 is configured to acquire format information of each document of the certification document.

The information-table-acquiring module 606 is configured to acquire a reliable-format table corresponding to the unique identification of the target application, and the reliable-format table for recording reliable format information corresponds to the unique identification of the target application.

The second searching module 607 is configured to search the reliable-format table corresponding to the unique identification of the target application.

The second determining module 608 is configured to, when the reliable-format table records the format information of each document of the certification document, determine that the certification document in the document contents is reliable.

Accordingly, the receiving module can directly receive the document contents sent from the terminal, and the extracting module can extract the certification document from the document contents. Thereby, the user does not need to submit a paper certification document, and the particular organization does not need to acquire the certification document from its network system. Therefore, the complexity of acquiring a certification document can be effectively reduced, and the efficiency of acquiring the certification document can be improved.

The embodiment of the present disclosure also provides a terminal for acquiring a certification document, including: a processor; and a memory for storing instructions executable by the processor; wherein the processor is configured to perform: determining a target application for providing the certification document according to a user-input identification of a legal source of the certification document; acquiring page contents of the target application, the page contents containing the certification document; and sending document contents including the page contents or the certification document to a certification-document extracting server to enable the certification-document extracting server to extract the certification document from the document contents.

The embodiment of the present disclosure also provides a server for acquiring a certification document, including: a processor; and a memory for storing instructions executable by the processor; wherein the processor is configured to perform: receiving document contents from a terminal, the document contents including page contents or the certification document, the page contents being acquired from a target application for providing the certification document according to a user-input identification of a legal source of the certification document, and the page contents containing the certification document; and extracting the certification document from the document contents.

FIG. 7 is a block diagram illustrating still another device for acquiring a certification document according to yet another exemplary embodiment, which can be applied in the terminal 120 as shown in FIG. 1. For example, the device 700 can be a mobile phone, a computer, a digital broadcast terminal, a messaging device, a gaming console, a tablet, a medical device, exercise equipment, a personal digital assistant, and the like.

Referring to FIG. 7, the device 700 can include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the device 700, such as the operations associated with display, telephone calls, data communications, camera operations, and recording operations. The processing component 702 can include one or more processors 720 to execute instructions to perform all or part of the steps in the above described methods. Moreover, the processing component 702 can include one or more modules which facilitate the interaction between the processing component 702 and other components. For instance, the processing component 702 can include a multimedia module to facilitate the interaction between the multimedia component 708 and the processing component 702.

The memory 704 is configured to store various types of data to support the operation of the device 700. Examples of such data include instructions for any applications or methods operated on the device 700, contact data, phonebook data, messages, pictures, video, etc. The memory 704 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 can include a power management system, one or more power sources, and any other components associated with the generation, management, and distribution of power in the device 700.

The multimedia component 708 includes a screen providing an output interface between the device 700 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 708 includes a front camera and/or a rear camera. The front camera and the rear camera can receive an external multimedia datum while the device 700 is in an operation mode, such as a photographing mode or a video mode. Each of the front camera and the rear camera can be a fixed optical lens system or have focus and optical zoom capability.

The audio component 710 is configured to output and/or input audio signals. For example, the audio component 710 includes a microphone ("MIC") configured to receive an external audio signal when the device 700 is in an operation mode, such as a call mode, a recording mode, and a voice recognition mode. The received audio signal can be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons can include, but are not limited to, a home button, a volume button, a starting button, and a locking button.

The sensor component 714 includes one or more sensors to provide status assessments of various aspects of the device 700. For instance, the sensor component 714 can detect an open/closed status of the device 700, relative positioning of components, e.g., the display and the keypad, of the device 700, a change in position of the device 700 or a component of the device 700, a presence or absence of user contact with the device 700, an orientation or an acceleration/deceleration of the device 700, and a change in temperature of the device 700. The sensor component 714 can include a proximity sensor configured to detect the presence of nearby objects without any physical contact. The sensor component 714 can also include a light sensor, such as a CMOS or CCD image sensor, for use in imaging applications. In some embodiments, the sensor component 714 can also include an accelerometer sensor, a gyroscope sensor, a magnetic sensor, a pressure sensor, or a temperature sensor.

The communication component 716 is configured to facilitate communication, wired or wirelessly, between the device 700 and other devices. The device 700 can access a wireless network based on a communication standard, such as WiFi, 2G, or 3G, or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the device 700 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods for acquiring a certification document.

In exemplary embodiments, there is also provided a non-transitory computer-readable storage medium including instructions, such as included in the memory 704, executable by the processor 720 in the device 700, for performing the above-described methods. For example, the non-transitory computer-readable storage medium can be a ROM, a RAM, a CD-ROM, a magnetic tape, a floppy disc, an optical data storage device, and the like.

A non-transitory computer readable storage medium, when instructions in the storage medium are executed by the processor of the device 700, the device 700 is enabled to perform the above method for acquiring a certification document.

Figures 4, 5, 6, 7, 8:
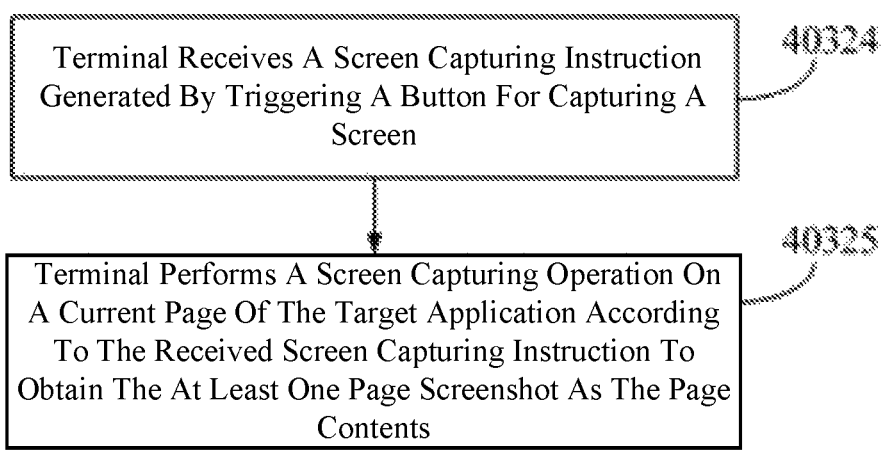
Figures 4, 5, 6, 7, 8, 9:
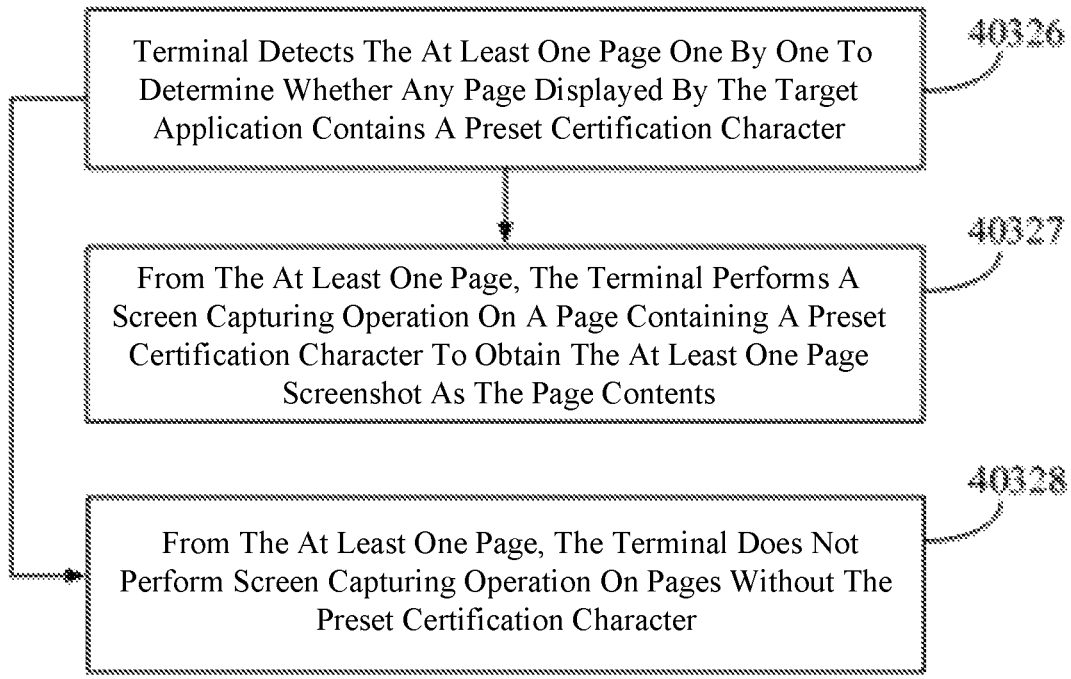
Figures 4, 5, 6, 7, 8, 9, 10:
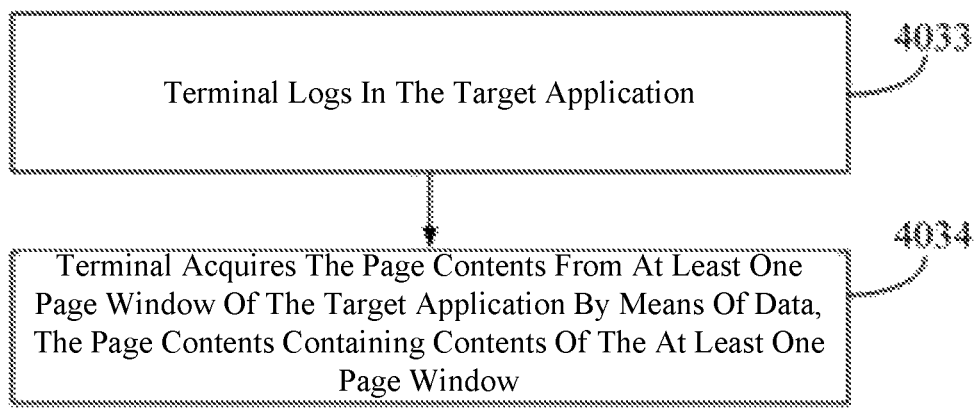
Figures 4, 5, 6, 7, 8, 9, 10, 11:
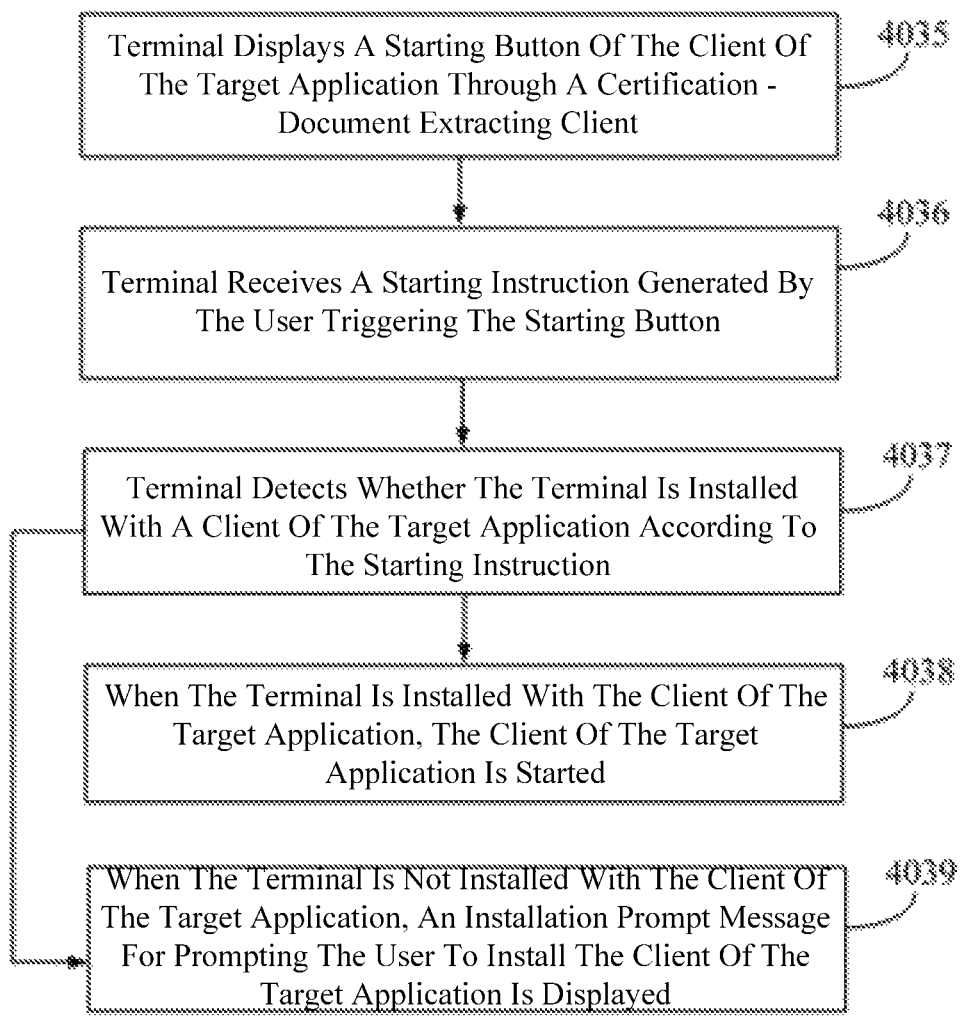
Figures 4, 5, 6, 7, 8, 9, 10, 11, 12:
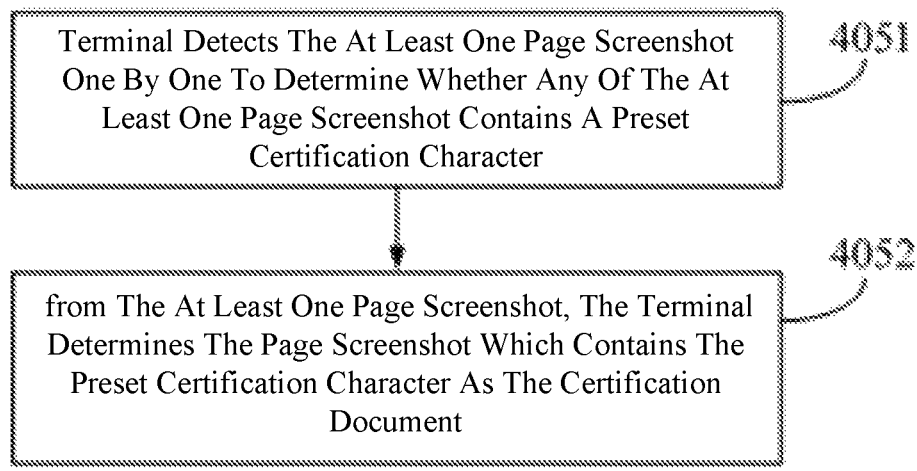
Figures 4, 5, 6, 7, 8, 9, 10, 11, 12, 13:
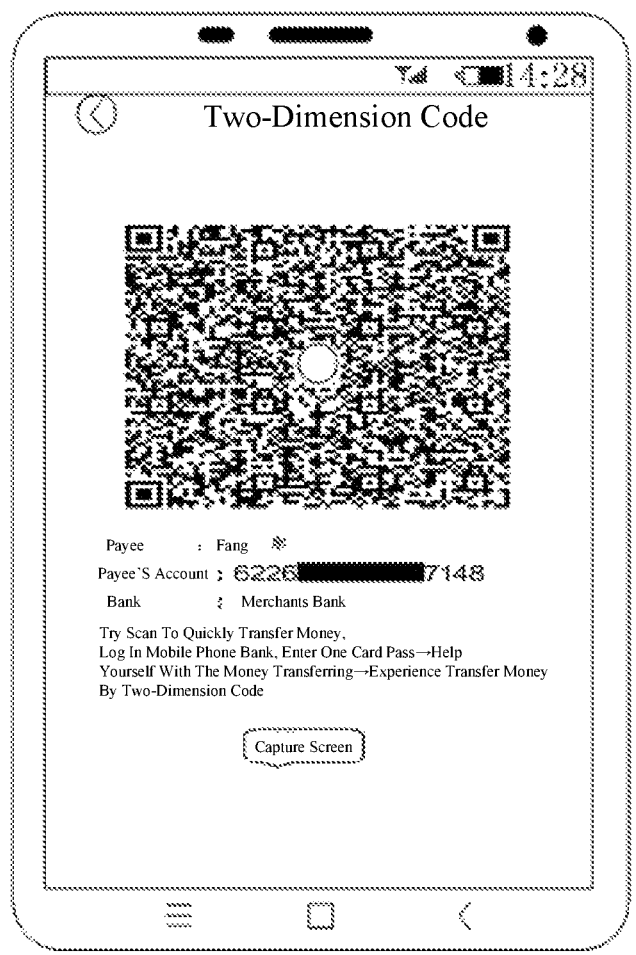
Figures 4, 5, 6, 7, 8, 9, 10, 11, 12, 13, 14:
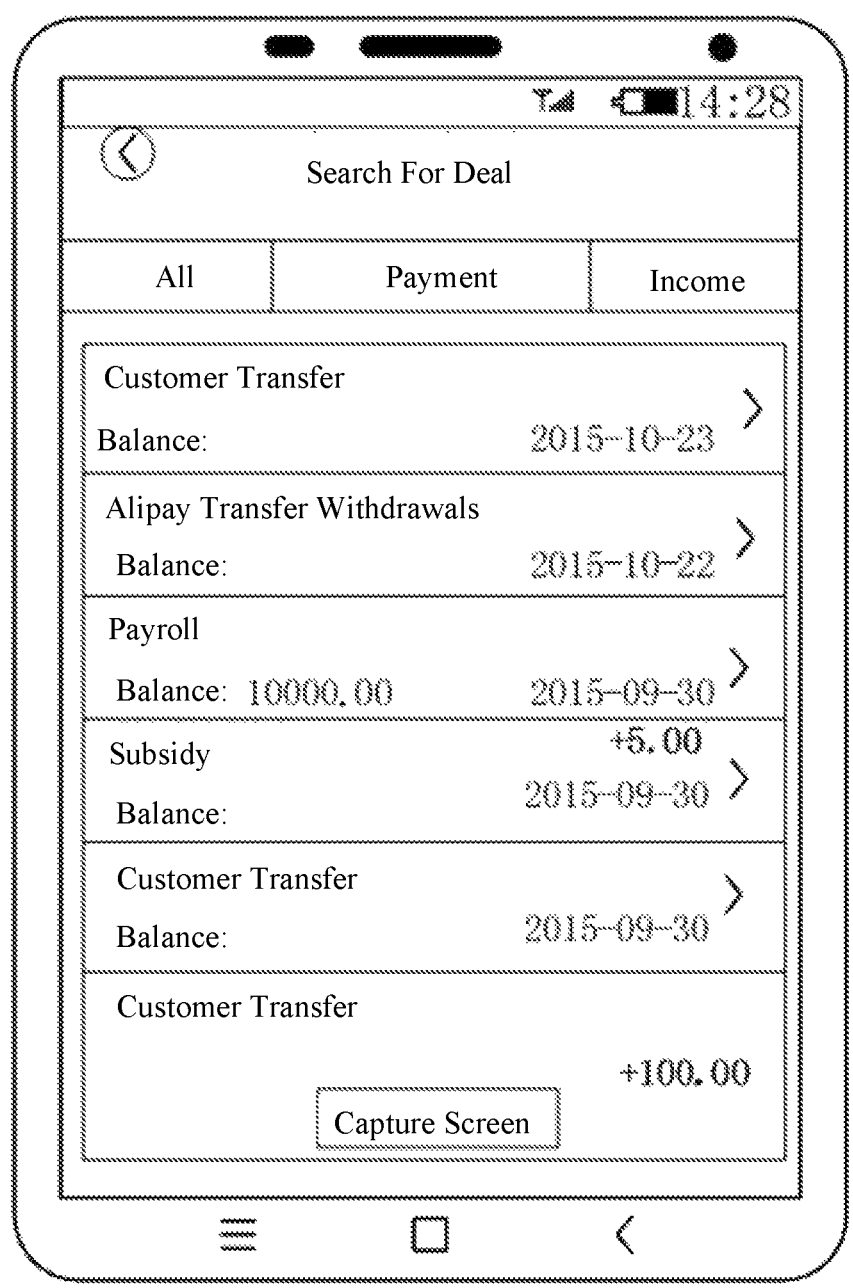
Figures 4, 5, 6, 7, 8, 9, 10, 11, 12, 13, 14, 15:
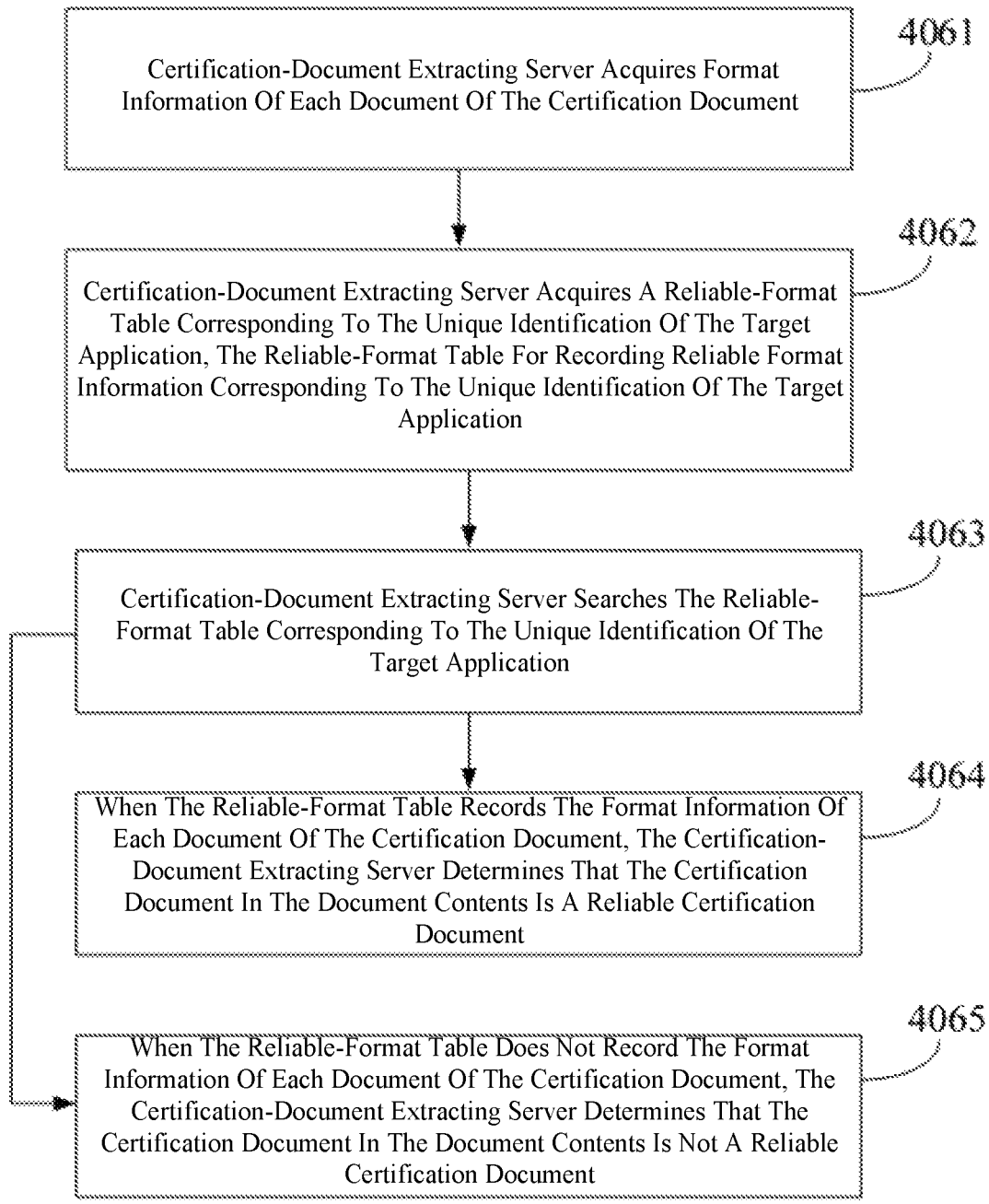
Figures 1, 5:
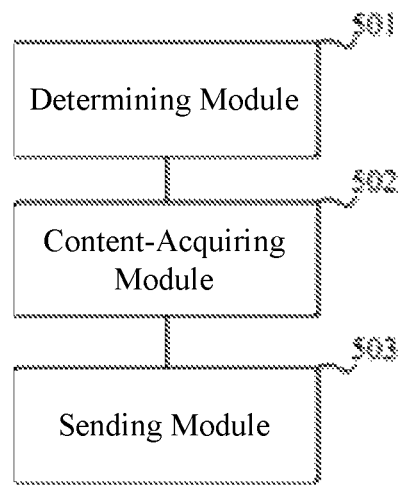
Figures 2, 5:
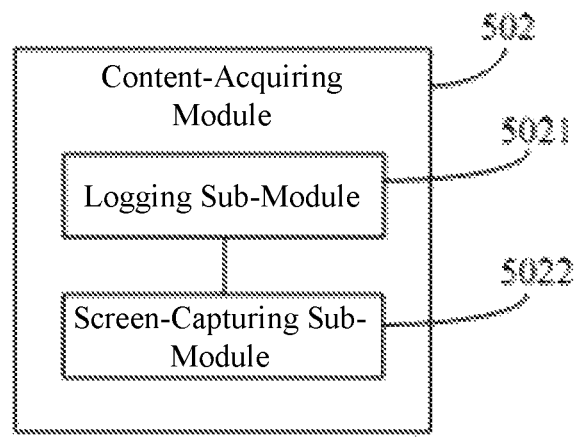
Figures 3, 5:
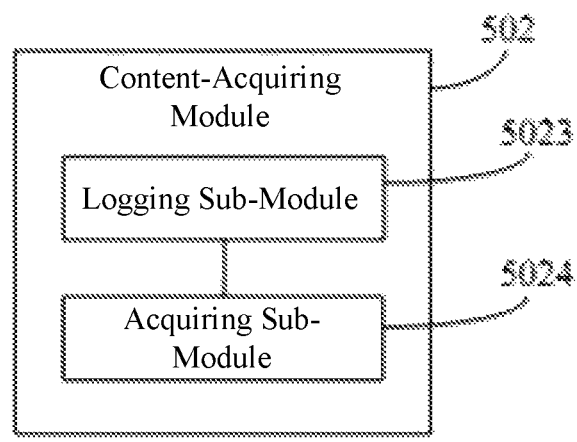
Figures 4, 5:
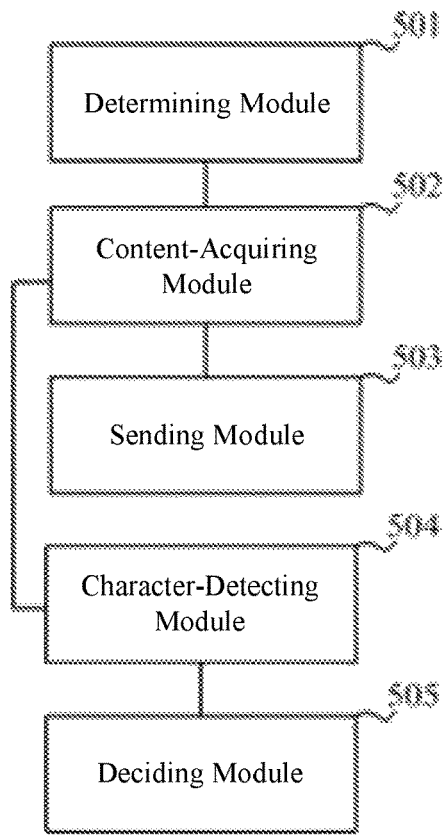
Figure 5:
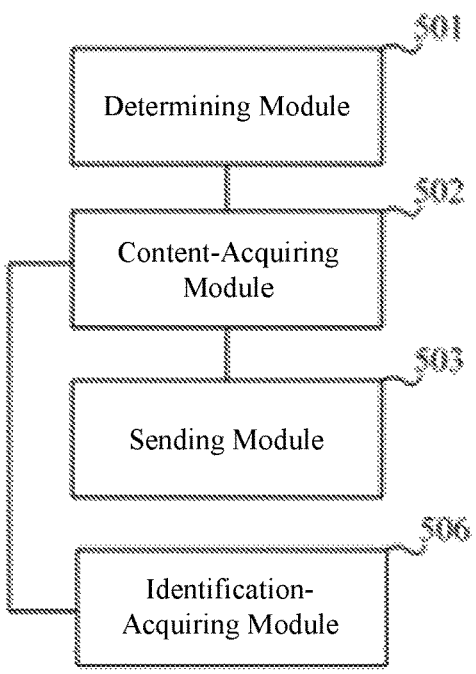
Figures 5, 6:
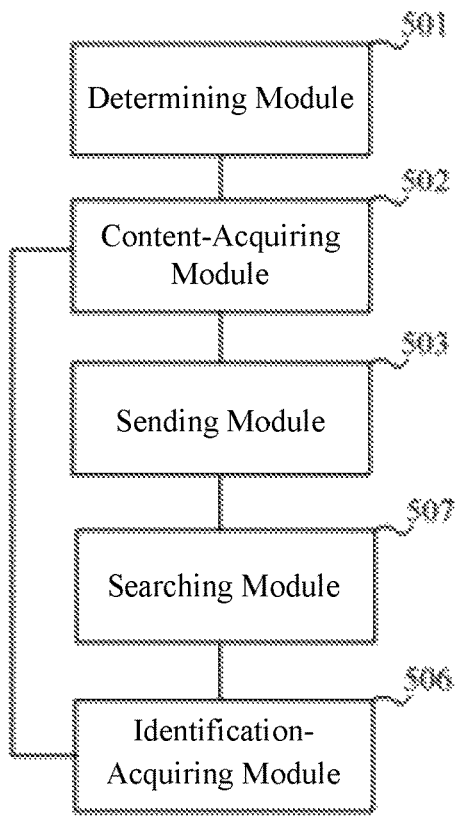
Figures 5, 6, 7:
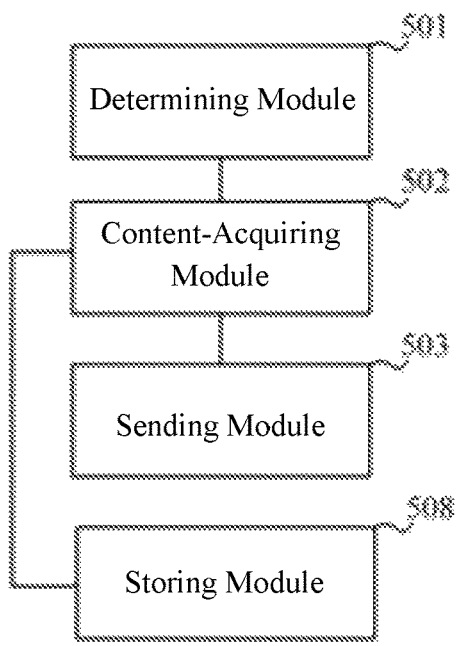
Figures 5, 6, 7, 8:
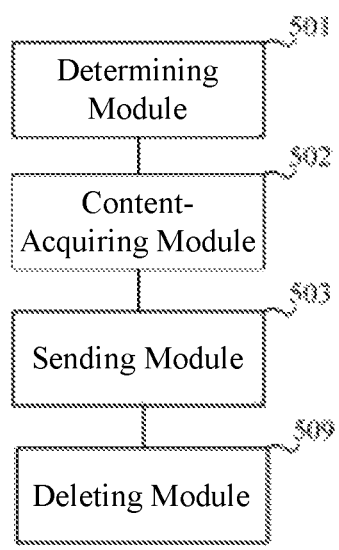
Figures 5, 6, 7, 8, 9:
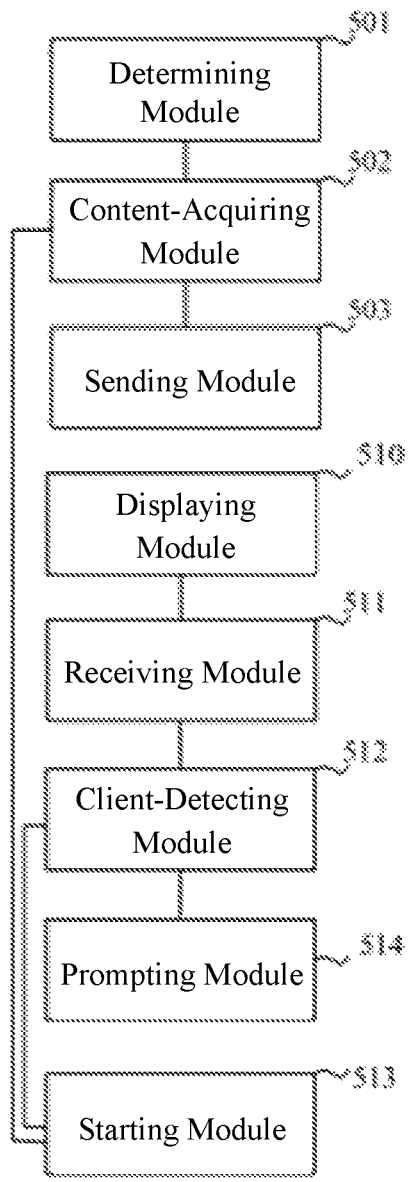
Figures 1, 6:
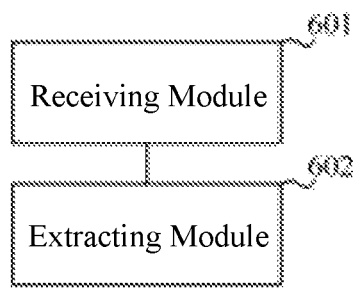
Figures 2, 6:
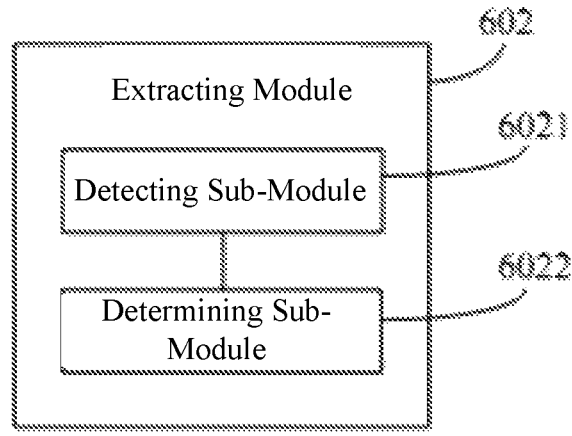
Figures 3, 6:
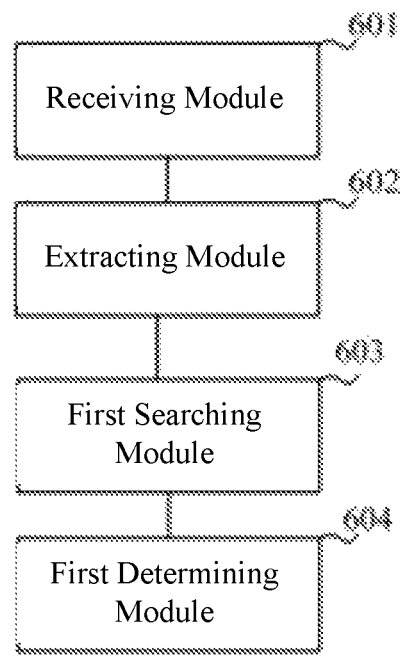
Figures 4, 6:
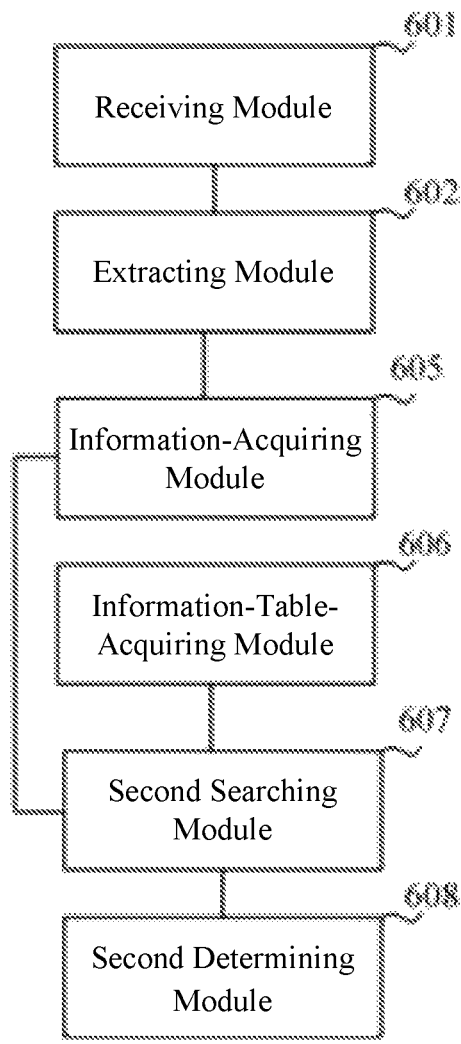
Figure 7:
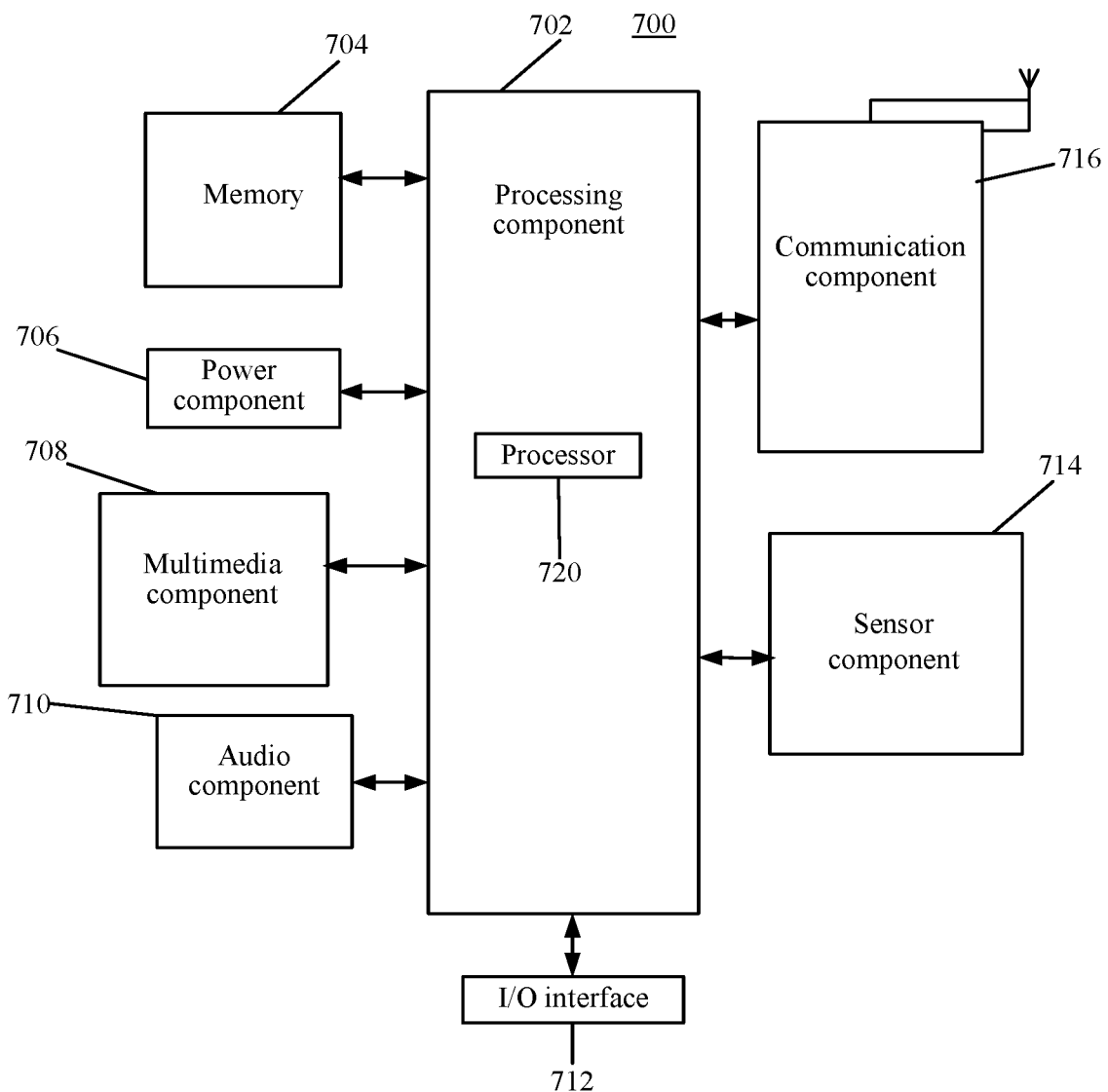
Figure 8:
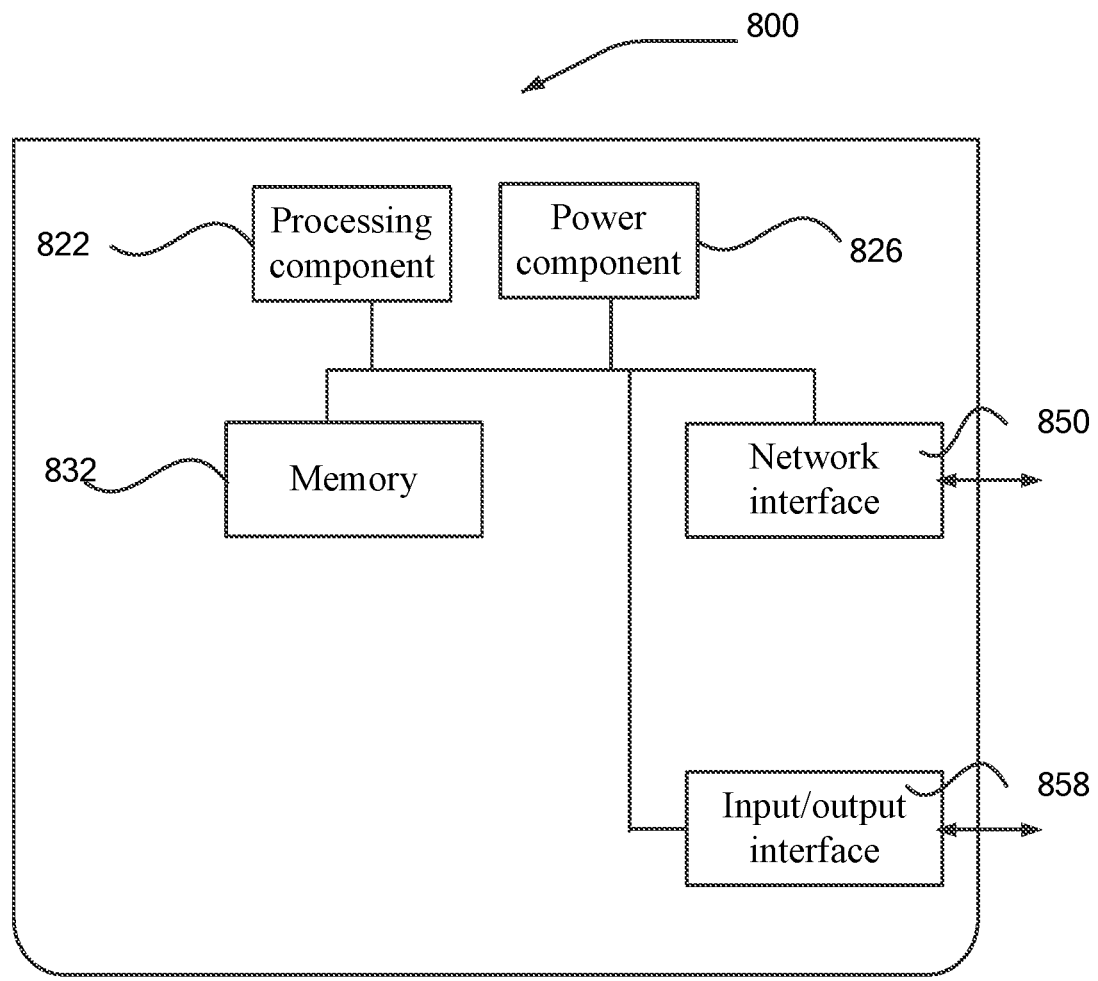

FIG. 8 is a block diagram illustrating still a device for acquiring a certification document according to still another exemplary embodiment. For example, the device 800 may be provided as a server, which can be applied as the certification-document extracting server 110 as shown in FIG. 1. Referring to FIG. 8, the device 800 includes a processing component 822 that further includes one or more processors, and memory resources represented by a memory 832 for storing instructions executable by the processing component 822, such as application programs. The application programs stored in the memory 832 may include one or more modules each corresponding to a set of instructions. Further, the processing component 822 is configured to execute the instructions to perform the above described method for acquiring a certification document.

The device 800 may also include a power component 826 configured to perform power management of the device 800, wired or wireless network interface(s) 850 configured to connect the device 800 to a network, and an input/output (I/O) interface 858. The device 800 may operate based on an operating system stored in the memory 832, such as Windows Server™, Mac OS X™, Unix™, Linux™, FreeBSD™, or the like.

Other embodiments of the present disclosure will be apparent to those skilled in the art from consideration of the specification and practice of the invention disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for acquiring a certification document certifying that a user has a particular property, the method comprising the followings steps:

determining, by a terminal, a target application for providing the certification document according to a user-input identification of a legal source of the certification document;

logging in, by the terminal, to the target application;

starting, by the terminal, a screen capturing operation on a log-in page displayed by the target application;

determining, by the terminal, whether a page displayed by the target application does not change over a preset time period or the target application displays the log-in page again;

stopping, by the terminal, the screen capturing operation in response to determining that the page displayed by the target application does not change over a preset time period or the target application displays the log-in page again;

taking, by the terminal, at least one page screenshot acquired from the start of the screen capturing operation to an end of the screen capturing operation as page contents, wherein the page contents contain the certification document; and sending, by the terminal, document contents comprising the page contents or the certification document to a certification-document extracting server;

extracting, by the certification-document extracting server, the certification document from the document contents with Optical Character Recognition technology.

2. The method of claim 1, wherein the method further comprises:

acquiring a unique identification of the target application during the screen capturing operation, the unique identification being verification data for uniquely verifying the legality of the screen capturing operation.

3. The method of claim 1, wherein the method further comprises:

storing the page contents in isolation in a predetermined position; and encrypting the stored page contents.

4. A terminal for acquiring a certification document certifying that a user has a particular property, the terminal comprising:

a processor; and a memory for storing instructions executable by the processor; wherein the processor is configured to perform:

determining a target application for providing the certification document according to a user-input identification of a legal source of the certification document;

logging in to the target application;

starting a screen capturing operation on a log-in page displayed by the target application;

determining whether a page displayed by the target application does not change over a preset time period or the target application displays the log-in page again;

stopping the screen capturing operation in response to determining that the page displayed by the target application does not change over a preset time period or the target application displays the log-in page again;

taking at least one page screenshot acquired from the start of the screen capturing operation to an end of the screen capturing operation as page contents, wherein the page contents contain the certification document; and sending document contents comprising the page contents or the certification document to a certification-document extracting server to enable the certification-document extracting server to extract the certification document from the document contents with Optical Character Recognition technology.

5. The terminal of claim 4, wherein the processor is further configured to perform:

acquiring a unique identification of the target application during the screen capturing operation, the unique identification being verification data for uniquely verifying the legality of the screen capturing operation.

* * * * *